US009275668B2

(12) United States Patent
Wang et al.

(10) Patent No.: US 9,275,668 B2
(45) Date of Patent: Mar. 1, 2016

(54) LIGHT COUPLING STRUCTURE, METHOD OF FORMING A LIGHT COUPLING STRUCTURE AND A MAGNETIC RECORDING HEAD

(75) Inventors: Qian Wang, Singapore (SG); Seng-Tiong Ho, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/131,677

(22) PCT Filed: Jul. 6, 2012

(86) PCT No.: PCT/SG2012/000242
§ 371 (c)(1),
(2), (4) Date: Mar. 19, 2014

(87) PCT Pub. No.: WO2013/009261
PCT Pub. Date: Jan. 17, 2013

(65) Prior Publication Data
US 2014/0211598 A1    Jul. 31, 2014

Related U.S. Application Data

(60) Provisional application No. 61/505,568, filed on Jul. 8, 2011.

(51) Int. Cl.
*G11B 11/00* (2006.01)
*G02B 6/26* (2006.01)
(Continued)

(52) U.S. Cl.
CPC .............. *G11B 5/6088* (2013.01); *G02B 6/122* (2013.01); *G02B 6/1245* (2013.01); *G02B 6/26* (2013.01); *G02B 6/32* (2013.01); *G11B 5/314* (2013.01);
(Continued)

(58) Field of Classification Search
CPC .......... G11B 5/466; G11B 2005/0021; G11B 5/314; G11B 2005/001; G11B 7/1384; G11B 7/1206; G11B 13/04; G11B 5/6088; G02B 6/22; G02B 6/1245; G02B 6/26; G02B 6/32; G02B 6/14
USPC .......... 369/13.33, 13.32, 13.24, 13.03, 13.02, 369/13.12, 13.13, 13.22, 13.01, 112.27; 385/28, 131
See application file for complete search history.

(56) References Cited

U.S. PATENT DOCUMENTS 8,264,919 B2 *  9/2012  Komura et al. ............ 369/13.33
8,441,895 B2 *  5/2013  Shimazawa et al. ....... 369/13.33
(Continued)

OTHER PUBLICATIONS

PCT International Search Report for PCT Counterpart Application No. PCT/SG2012/000242, 4 pgs., (Oct. 4, 2012).
(Continued)

*Primary Examiner* — Ali Neyzari
(74) *Attorney, Agent, or Firm* — Blakely, Sokoloff, Taylor & Zafman LLP

(57) ABSTRACT

A light coupling structure, a method of manufacturing a memory cell, and a magnetic recording head are provided. The light coupling structure includes a light coupling layer having a cavity; a waveguide having a cladding layer and a core layer; wherein the cladding layer of the waveguide is disposed in the cavity of the light coupling layer and the core layer of the waveguide is disposed over the light coupling layer and the cladding layer of the waveguide; wherein the light coupling layer is configured to receive light from a light source and couple the received light into the core layer of the waveguide.

19 Claims, 20 Drawing Sheets

(51) Int. Cl.
    *G11B 5/60*   (2006.01)
    *G02B 6/122*  (2006.01)
    *G02B 6/124*  (2006.01)
    *G11B 5/31*   (2006.01)
    *G02B 6/32*   (2006.01)
    *G11B 13/04*  (2006.01)
    *G11B 5/00*   (2006.01)

(52) U.S. Cl.
    CPC ........ G11B 13/04 (2013.01); *G11B 2005/0021* (2013.01)

(56) References Cited

U.S. PATENT DOCUMENTS

| | | |
|---|---|---|
| 2004/0001420 A1 | 1/2004 | Challener |
| 2010/0302672 A1 | 12/2010 | Aoki et al. |
| 2011/0205660 A1 | 8/2011 | Komura et al. |
| 2012/0082016 A1 | 4/2012 | Komura et al. |

OTHER PUBLICATIONS

PCT Written Opinion of the International Searching Authority for PCT Counterpart Application No. PCT/SG2012/000242, 3 pgs., (Oct. 4, 2012).

PCT Notification Concerning Transmittal of International Preliminary Report on Patentability (Chapter I of the Patent Cooperation Treaty) for PCT Counterpart Application No. PCT/SG2012/000242, 5 pgs., (Jan. 23, 2014).

Qian Wang, et al., "Thin-film stack based integrated GRIN coupler with aberration-free focusing and super-high NA for efficient fiber-to-nanophotonic-chip coupling", Optics Express, vol. 18, No. 5, pp. 4574-4589, (Mar. 1, 2010).

\* cited by examiner

LIGHT COUPLING STRUCTURE, METHOD OF FORMING A LIGHT COUPLING STRUCTURE AND A MAGNETIC RECORDING HEAD

CROSS-REFERENCE TO RELATED APPLICATIONS

This patent application is a U.S. National Phase Application under 35 U.S.C. §371 of International Application No. PCT/SG2012/000242, filed Jul. 6, 2012, entitled LIGHT COUPLING STRUCTURE, METHOD OF FORMING A LIGHT COUPLING STRUCTURE AND A MAGNETIC RECORDING HEAD, which claims priority to U.S. Provisional Patent Application No. 61/505,568, filed Jul. 8, 2011.

TECHNICAL FIELD

Various embodiments relate generally to a light coupling structure, a method of manufacturing a memory cell, and a magnetic recording head.

BACKGROUND

A heat assisted magnetic recording (HAMR) head for high density data storage generally requires laser thermal assistance to locally heat a media. FIG. 1 shows a schematic diagram of a conventional optical delivery system 100. The conventional optical delivery system 100 uses a waveguide 102 which is integrated in the HAMR head 104 and close to a recording pole 106. The waveguide 102 guides the light from a light source (e.g. a laser diode) (not shown) to a media 108. The media 108 is locally heated before reaching the recording head 104.

FIG. 2a shows a schematic diagram of the waveguide 102. The waveguide 102 integrated in the write head 104 (FIG. 1) has a first cladding layer 202, a second cladding layer 204 and a core layer 206 disposed between the first cladding layer 202 and the second cladding layer 204. For example, the core layer 206 of the waveguide 102 includes silicon nitride and has a thickness of about 300 nm. The refractive index of the core layer 206 is 2.0 and the refractive index of the first cladding layer 202 and the second cladding layer 206 is 1.5 at a wavelength of about 780 nm. The waveguide 102 usually has a much smaller spot size at least in one direction (for example, in a direction along a y-axis) when compared to a light beam 208 from the light source (not shown).

FIG. 2b shows a graph 210 of amplitude plotted against distance. Plot 212 shows an Eigenmode profile of the waveguide 102 and plot 214 shows a field profile of the laser beam 208. From plot 212, it can be observed that the mode field diameter of the waveguide 102 is about 0.4 μm. From plot 214, it can be observed that the input laser beam 208 has a Gaussian profile $$E(y) = \exp\left(-4\frac{y^2}{W_e^2}\right)$$

in a y-z plane, whereby y is a distance extending in a direction along a y-axis and $W_e$ is a spot size diameter of the laser beam 208 (e.g. the spot size diameter can be $W_e$=4 μm). Plot 212 and plot 214 show a mismatch of the spot size between the laser beam 208 and the eigenmode of the waveguide 102. As such, an optical device is required to couple the light beam 208 from a light source (not shown) into the waveguide 102.

FIG. 3 shows a schematic diagram of a conventional recording head 302. The recording head 302 includes a waveguide 304 to guide the light 305 from a light source (e.g. laser diode) (not shown) to a media 306. The waveguide 304 uses a grating structure 308 to couple the light from the light source (not shown) into the waveguide 304 (as described for example in US 2004/0001420 A1 "Heat assisted magnetic recording head with a planar waveguide"). However, the grating based coupler 308 has a limited coupling efficiency and has a strict requirement on the assembling of the light source (not shown) as compared to the butt-coupling.

SUMMARY

According to one embodiment, a light coupling structure is provided. The light coupling structure includes a light coupling layer having a cavity; a waveguide having a cladding layer and a core layer; wherein the cladding layer of the waveguide is disposed in the cavity of the light coupling layer and the core layer of the waveguide is disposed over the light coupling layer and the cladding layer of the waveguide; wherein the light coupling layer is configured to receive light from a light source and couple the received light into the core layer of the waveguide.

According to another embodiment, a magnetic recording head is provided. The magnetic recording head includes a light structure described above; and a writing head disposed adjacent to the waveguide.

According to yet another embodiment, a method of forming a light coupling structure is provided. The method includes forming a light coupling layer; etching the light coupling layer to form a cavity; depositing a cladding layer of a waveguide in the cavity of the light coupling layer; and depositing a core layer of the waveguide over the light coupling layer and the cladding layer of the waveguide.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Embodiments of a light coupling structure, a method of manufacturing a memory cell, and a magnetic recording head will be described in detail below with reference to the accompanying figures. It will be appreciated that the embodiments described below can be modified in various aspects without changing the essence of the invention.

An apparatus for light coupling in a heat assisted magnetic recording (HAMR) head and a method of making the same are described. The apparatus for light coupling may include a waveguide and an optical coupler integrated at one end of the waveguide. The integrated coupler may act as a planar graded refractive index lens which focuses a light beam from a light source (e.g. laser diode) into the waveguide.

Figure 1:
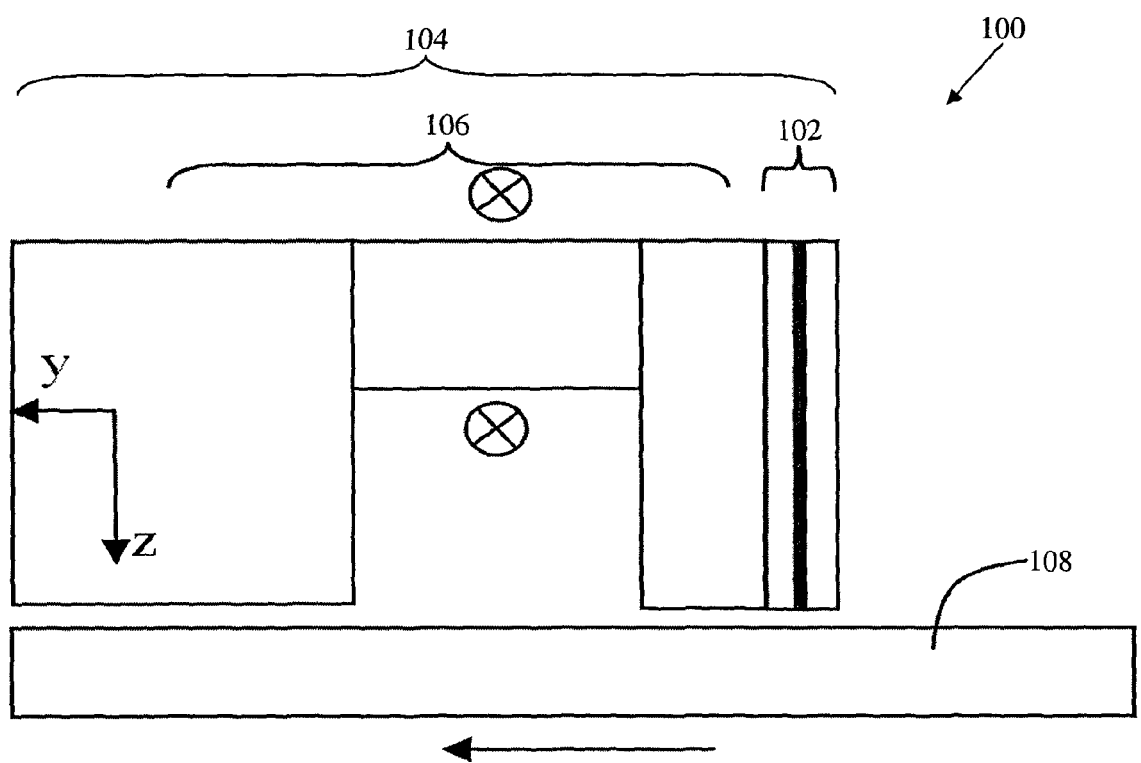
FIG. 1 shows a schematic diagram of a conventional optical delivery system.
Figure 2A:
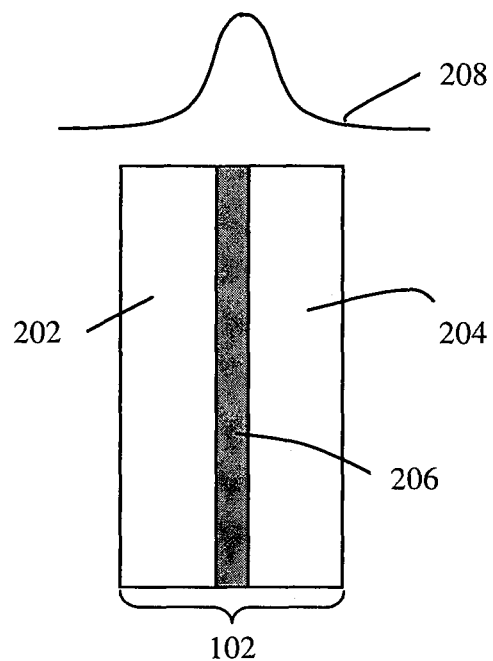
FIG. 2a shows a schematic diagram of a waveguide of a conventional optical delivery system.
Figure 2B:
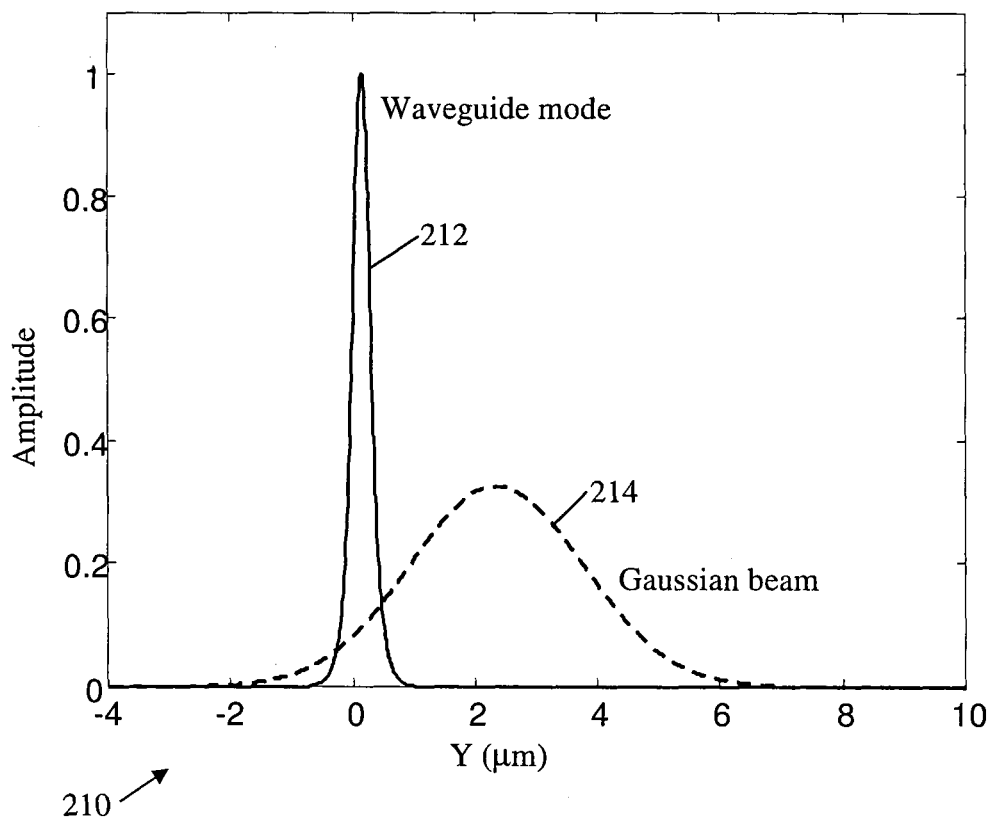
FIG. 2b shows a graph of amplitude plotted against distance for a conventional optical delivery system.
Figure 3:
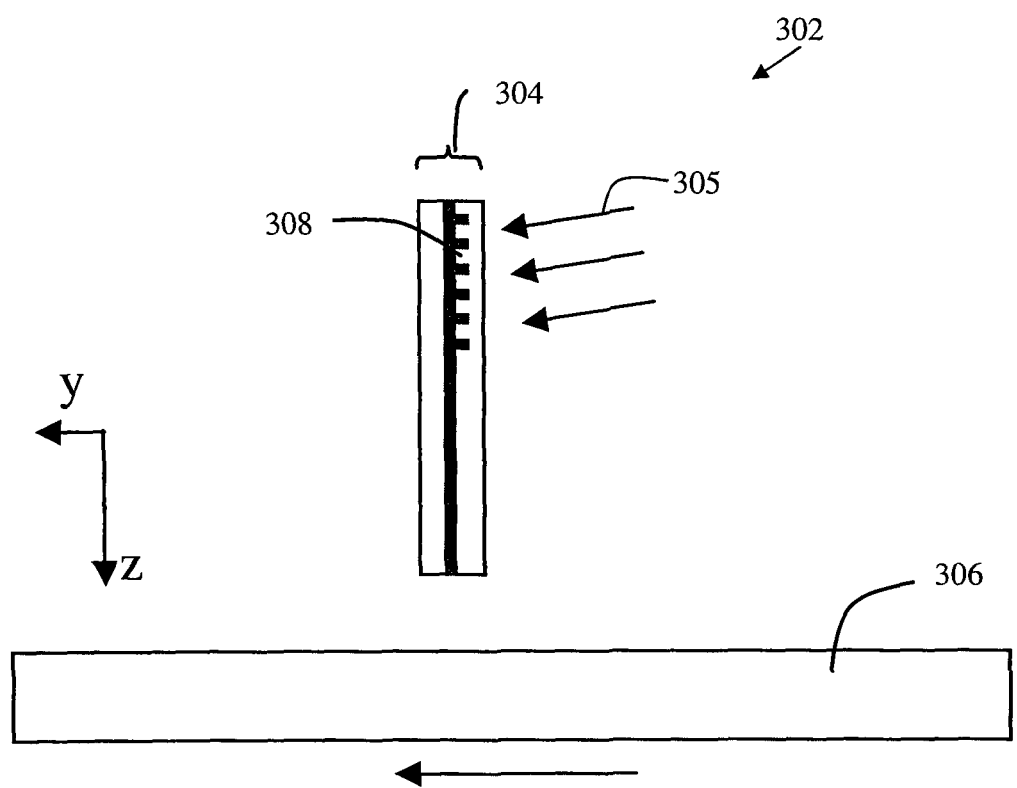
FIG. 3 shows a schematic diagram of a conventional recording head.
Figure 4:
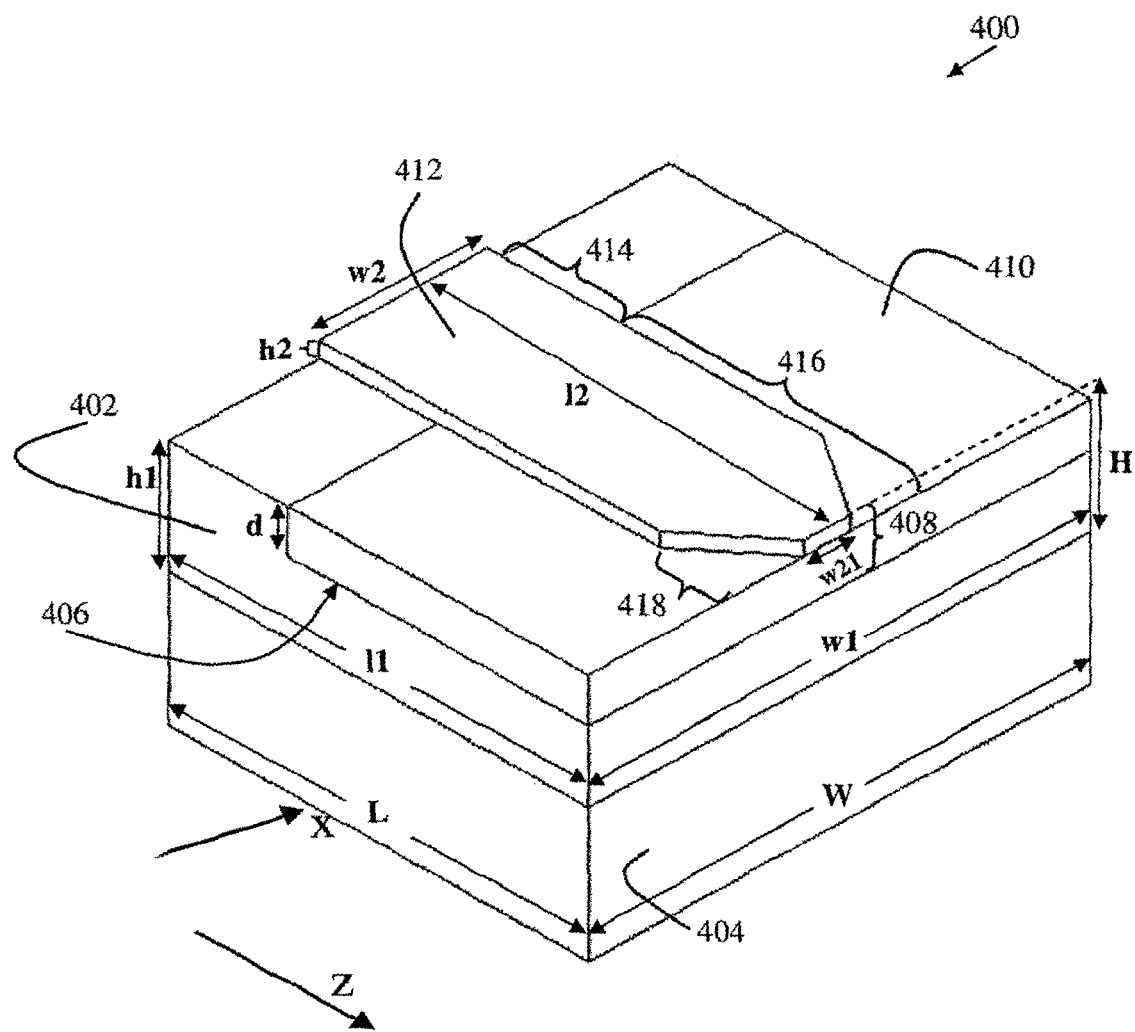
FIG. 4 shows a three-dimensional view of a light coupling structure according to one embodiment.

FIG. 4 shows a three-dimensional view of a light coupling structure 400 according to one embodiment. The light coupling structure 400 includes a light coupling layer 402 and a substrate 404. The light coupling layer 402 is disposed on the substrate 404. The light coupling layer 402 has a cavity 406.

In one embodiment, the light coupling structure 400 may have a length (L) (along a z-axis) ranging from about 100 μm to about 600 μm, a width (W) (along an x-axis) ranging from about 300 μm to about 1000 μm, and a height (H) (along a y-axis) ranging from about 1 μm to about 20 μm (not considering a height of the substrate 404). The light coupling layer 402 may have a length (l1) (along the z-axis) ranging from about 100 μm to about 600 μm, a width (w1) (along the x-axis) ranging from about 300 μm to about 1000 μm, and a height (h1) (along the y-axis) ranging from about 1 μm to about 20 μm. The cavity 406 may have a depth (d) (along the y-axis) ranging from about 0.5 μm to about 2 μm.

In one embodiment, the light coupling layer 402 is a planar graded refractive index (GRIN) lens. The light coupling layer 402 may have a graded refractive index profile. The light coupling layer 402 may have a graded refractive index in a direction along the y-axis. The light coupling layer 402 may have a refractive index that decreases along a dimension of the light coupling layer 402 which extends along the y-axis. The refractive index of the light coupling layer 402 may decrease from an initial value $n_0$ to a final value $n_R$. The initial value $n_0$ of the refractive index of the light coupling layer 402 and the final value $n_R$ of the refractive index of the light coupling layer 402 may vary in different embodiments.

Various materials may be used for the light coupling layer 402. In one embodiment, the light coupling layer 402 may include silicon oxynitride. In another embodiment, the light coupling layer 402 may include at least two materials. The two materials may include but are not limited to silicon nitride and silicon dioxide.

The light coupling structure 400 also includes a waveguide 408 having a cladding layer 410 and a core layer 412. The cladding layer 410 of the waveguide 408 is disposed in the cavity 406 of the light coupling layer 402. The core layer 412 of the waveguide 408 is disposed over the light coupling layer 402 and the cladding layer 410 of the waveguide 408.

The core layer 412 of the waveguide 408 covers a portion 414 of the light coupling layer 402 and a portion 416 of the cladding layer 410. The core layer 412 extends across the light coupling layer 402 and the cladding layer 410 along the z-axis. The core layer 412 has a tapering end region 418.

In one embodiment, the cladding layer 410 may have the same dimensions as the cavity 406 of the light coupling layer 402. The core layer 412 may have a width (w2) (along the x-axis) ranging from about 2 μm to about 10 μm and a height (h2) (along the y-axis) ranging from about 200 nm to about 500 nm. A length (l2) (along the z-axis) of the core layer 412 may have the same size as the length (l1) of the light coupling layer 402. The tapering end region 418 of the core layer 412 may have a width (w21) (along the x-axis) ranging from about 200 nm to about 2 μm.

The cladding layer 410 may have a refractive index ranging from about 1.45 to about 2.0. Various materials may be used for the cladding layer 410. Examples of the materials used for the cladding layer 410 may include but are not limited to silicon dioxide, silicon oxy-nitride and aluminum oxide.

The refractive index of the core layer 412 is higher than the refractive index of the cladding layer 410. The core layer 412 may have a refractive index ranging from about 1.6 to about 3.5. Various materials may be used for the core layer 412. Examples of the materials used for the core layer 412 may include but are not limited to silicon nitride, titanium oxide and silicon.

The waveguide 408 may include a further cladding layer (not shown) disposed on the core layer 412 of the waveguide 408. The further cladding layer may cover the whole core layer 412. The further cladding layer may have a refractive index ranging from about 1.45 to about 2.0. Various materials may be used for the further cladding layer. Examples of the materials used for the further cladding layer may include but are not limited to silicon dioxide, silicon oxy-nitride and aluminum oxide.

Figure 5A:
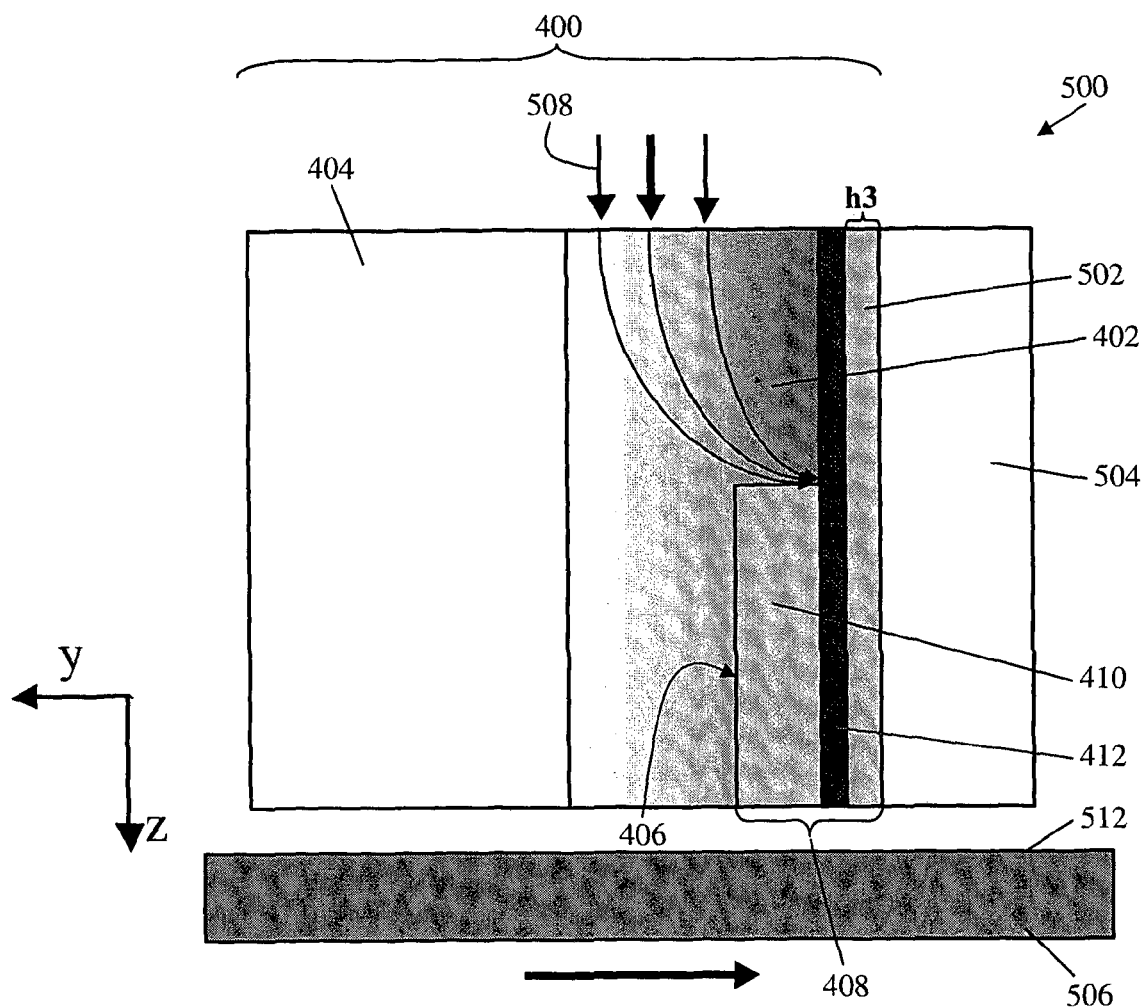
FIG. 5a shows a side view of a magnetic recording head according to one embodiment.

FIG. 5a shows a side view of a magnetic recording head 500 having the light coupling structure 400. FIG. 5a shows the side view of a magnetic recording head 500 in a y-z plane. The further cladding layer 502 of the waveguide 408 of the light coupling structure 400 is shown in FIG. 5a. In one embodiment, the further cladding layer 502 may have a height (h3) along a y-axis ranging from about 500 nm to about 2 µm. A length and a width of the further cladding layer 502 may have the same size as the length (L) and the width (W) of the light coupling structure 400 respectively. The magnetic recording head 500 has a writing head 504 disposed adjacent to the waveguide 408. If the magnetic recording head 500 is viewed in a three-dimensional view according to that of the light coupling structure 400 shown in FIG. 4, it will be seen that the writing head 504 is disposed above the waveguide 408 (e.g. formed on top of the further cladding layer 502 of the waveguide 408). In one embodiment, the magnetic recording head 500 may be a heat assisted magnetic recording head.

A media layer or a recording layer 506 is disposed below the magnetic recording head 500. The writing head 504 can write bits of information onto a media layer or a recording layer 506 when the media layer or recording layer 506 moves in a circular motion or spins under the writing head 504. A light 508 from a light source (not shown) is coupled into the light coupling structure 400 from the top of the magnetic recording head 500. The light 508 is coupled into the light coupling structure 400 in a direction along a z-axis. Examples of the light source may include but are not limited to a laser diode and a light emitting diode. The light 508 coupled into the light coupling structure 400 may have a wavelength ranging from about 400 nm to about 1600 nm.

The light coupling layer 402 of the light coupling structure 400 receives the light 508 and couples the received light 508 into the core layer 412 of the waveguide 408. The light coupling layer 402 has a graded refractive index along the y-axis. The refractive index of the light coupling layer 402 may range from $n_0$ (for example, 2.0 to match a refractive index of the core layer 412 of the waveguide 408) to $n_R$ (for example, 1.5), which focuses or directs the light 508 in a direction along the y-axis to the core layer 412 of the waveguide 408. The light 508 is guided along the core layer 412 of the waveguide 408 (e.g. propagates in the core layer 412) in a direction along a z-axis because of a higher refractive index (e.g. 2.0) of the core layer 412 as compared to the refractive index (e.g. 1.5) of the cladding layer 410 and the further cladding layer 502. The waveguide 408 may then direct the light 508 to the media layer or the recording layer 506. The waveguide 408 may guide the light 508 to e.g. an air bearing surface 512 of the media layer or the recording layer 506. The media layer or recording layer 506 may be heated locally by the light delivered from the waveguide 408 before reaching the writing head 504 (e.g. before the writing head 504 starts writing bits of information onto the media layer or recording layer 506).

Figure 5B:
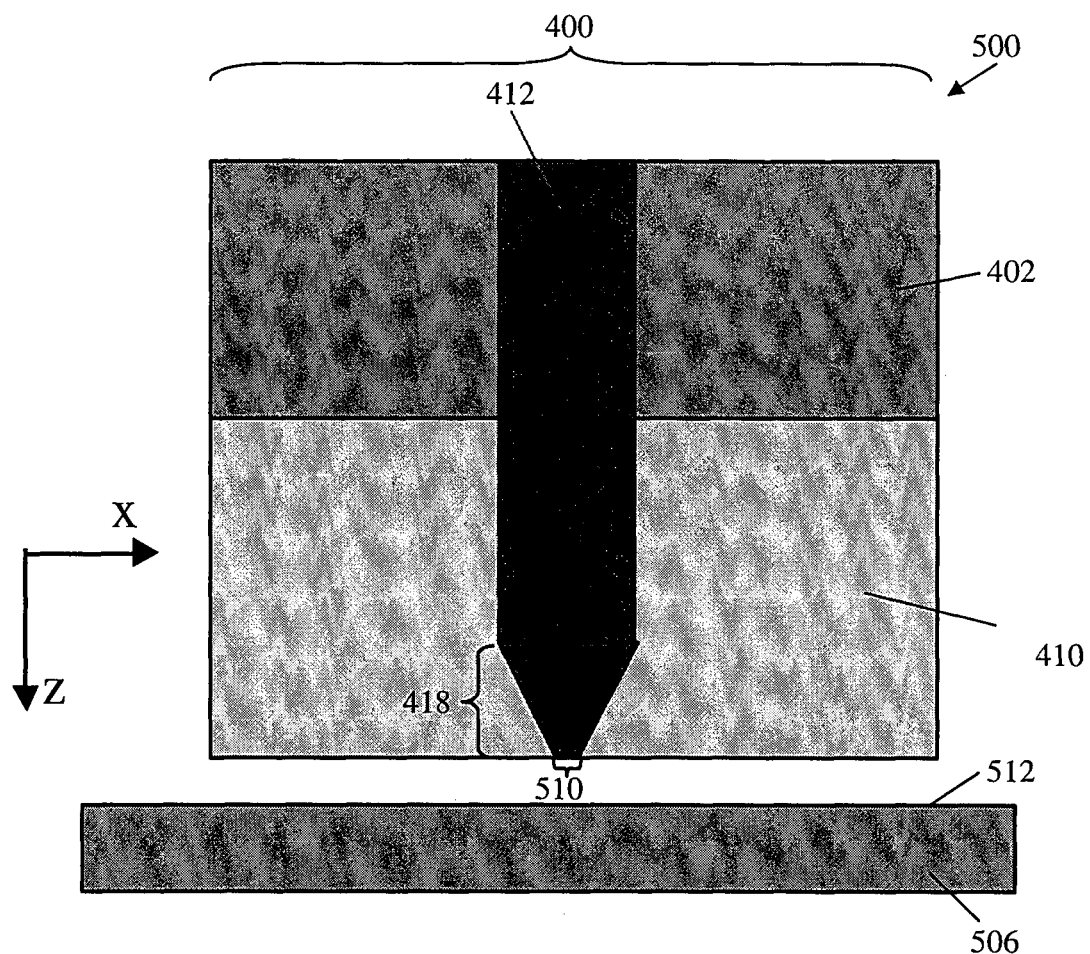
FIG. 5b shows an end view of a magnetic recording head according to one embodiment.

FIG. 5b shows an end view of the magnetic recording head 500. FIG. 5b shows an end view of the light coupling structure 400 of the magnetic recording head 500 in an x-z plane. The magnetic recording head 500 is arranged such that the tapering end region 418 of the core layer 412 is facing the media layer or recording layer 506. The tapering end region 418 is tapered in the x-z plane to an end 510. The end 510 may have a sub-micrometer width for light coupling to a transducer (not shown). The end 510 may have a width ranging from about 200 nm to about 2 µm. In one embodiment, the end 510 may have a width of about 300 nm.

Figure 6:
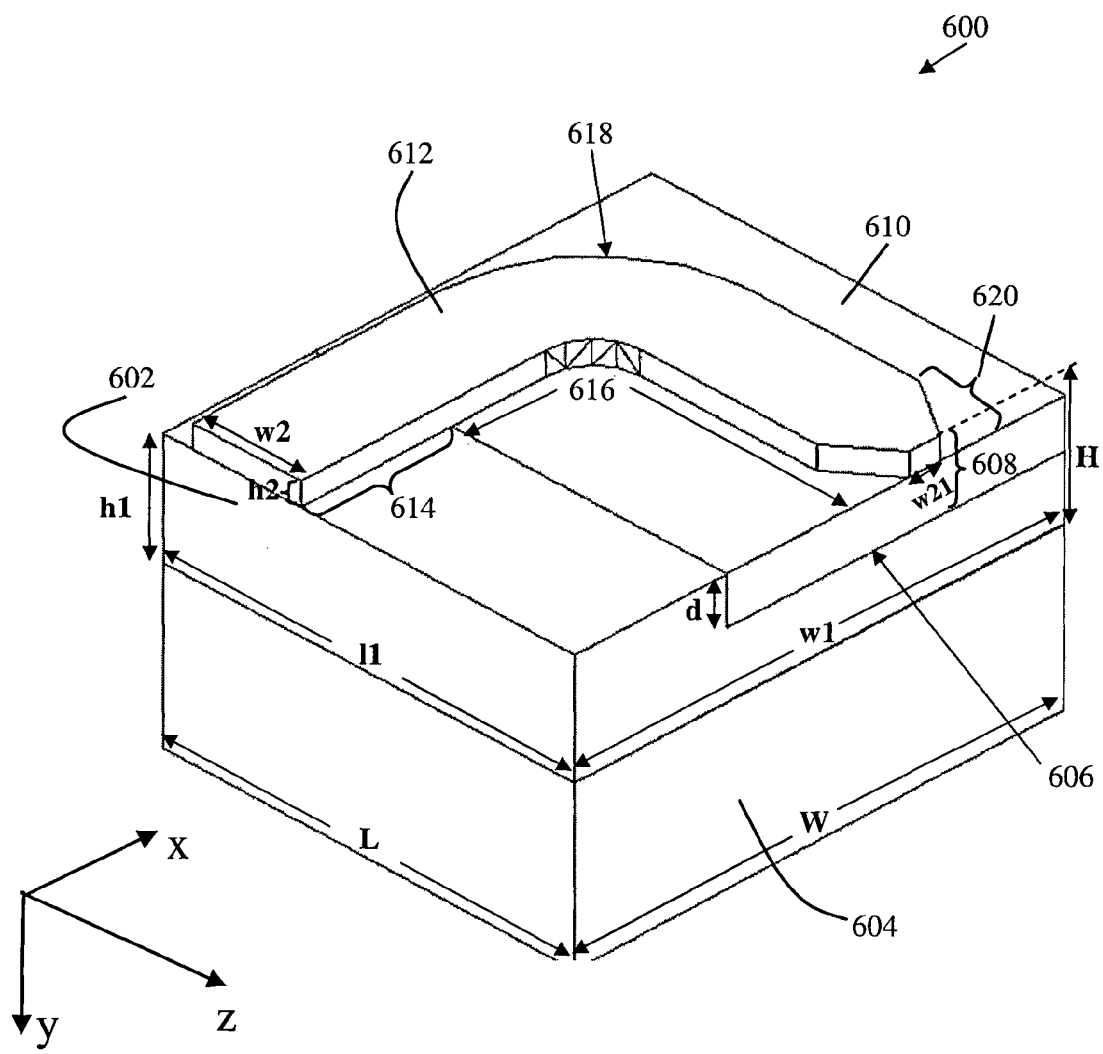
FIG. 6 shows a three-dimensional view of a light coupling structure according to one embodiment.

FIG. 6 shows a three-dimensional view of a light coupling structure 600 according to one embodiment. The light coupling structure 600 includes a light coupling layer 602 and a substrate 604. The light coupling layer 602 is disposed on the substrate 604. The light coupling layer 602 has a cavity 606.

In one embodiment, the light coupling structure 600 may have a length (L) (along a z-axis) ranging from about 100 µm to about 600 µm, a width (W) (along an x-axis) ranging from about 300 µm to about 1000 µm, and a height (H) (along a y-axis) ranging from about 1 µm to about 20 µm (not considering a height of the substrate 604). The light coupling layer 602 may have a length (l1) (along the z-axis) ranging from about 100 µm to about 600 µm, a width (w1) (along the x-axis) ranging from about 300 µm to about 1000 µm, and a height (h1) (along the y-axis) ranging from about 1 µm to about 20 µm. The cavity 606 may have a depth (d) (along the y-axis) ranging from about 0.5 µm to about 2 µm.

The light coupling layer 602 may be a planar graded refractive index (GRIN) lens. The light coupling layer 602 may have a graded refractive index profile. The light coupling layer 602 may have a graded refractive index in a direction along a y-axis. The light coupling layer 602 may have a refractive index that decreases along a dimension of the light coupling layer 602 which extends along the y-axis. The refractive index of the light coupling layer 602 may decrease from an initial value $n_0$ to a final value $n_R$. The initial value $n_0$ of the refractive index of the light coupling layer 602 and the final value $n_R$ of the refractive index of the light coupling layer 602 may vary in different embodiments.

Various materials may be used for the light coupling layer 602. In one embodiment, the light coupling layer 602 may include silicon oxynitride. In another embodiment, the light coupling layer 402 may include at least two materials. The two materials may include but are not limited to silicon nitride and silicon dioxide.

The light coupling structure 600 also includes a waveguide 608 having a cladding layer 610 and a core layer 612. The cladding layer 610 of the waveguide 608 is disposed in the cavity 606 of the light coupling layer 602. The core layer 612 of the waveguide 608 is disposed over the light coupling layer 602 and the cladding layer 610 of the waveguide 608.

The core layer 612 of the waveguide 608 covers a portion 614 of the light coupling layer 602 and a portion 616 of the cladding layer 610. The core layer 612 extends across the light coupling layer 602 and the cladding layer 610 along an x-axis and along a z-axis.

In one embodiment, the core layer 612 is L-shaped. The core layer 612 has a bending portion 618. The radius of the bending portion 618 may be tens of micrometers. The bending portion 618 may allow a light source (not shown) to be mounted in a y-z plane. The core layer 612 also has a tapering end region 620.

In one embodiment, the cladding layer 610 may have the same dimensions as the cavity 406 of the light coupling layer 602. The core layer 612 may have a width (w2) (along the x-axis) ranging from about 2 µm to about 10 µm and a height (h2) (along the y-axis) ranging from about 200 nm to about 500 nm. The tapering end region 620 of the core layer 612 may have a width (w21) (along the x-axis) ranging from about 200 nm to about 2 µm.

The cladding layer 610 may have a refractive index ranging from about 1.45 to about 2.0. Various materials may be used for the cladding layer 610. Examples of the materials used for the cladding layer 610 may include but are not limited to silicon dioxide, silicon oxy-nitride and aluminum oxide.

The refractive index of the core layer 612 is higher than the refractive index of the cladding layer 610. The core layer 612 may have a refractive index ranging from about 1.6 to about 3.5. Various materials may be used for the core layer 612. Examples of the materials used for the core layer 612 may include but are not limited to silicon nitride, titanium oxide and silicon.

The waveguide 608 may include a further cladding layer (not shown) disposed on the core layer 612 of the waveguide 608. In one embodiment, the further cladding layer may cover only the whole core layer 612. In another embodiment, the further cladding layer may cover the core layer 612, the light coupling layer 602 and the cladding layer 610. The further cladding layer may have a refractive index ranging from about 1.45 to about 2.0. Various materials may be used for the further cladding layer. Examples of the materials used for the further cladding layer may include but are not limited to silicon dioxide, silicon oxy-nitride and aluminum oxide.

Figure 7A:
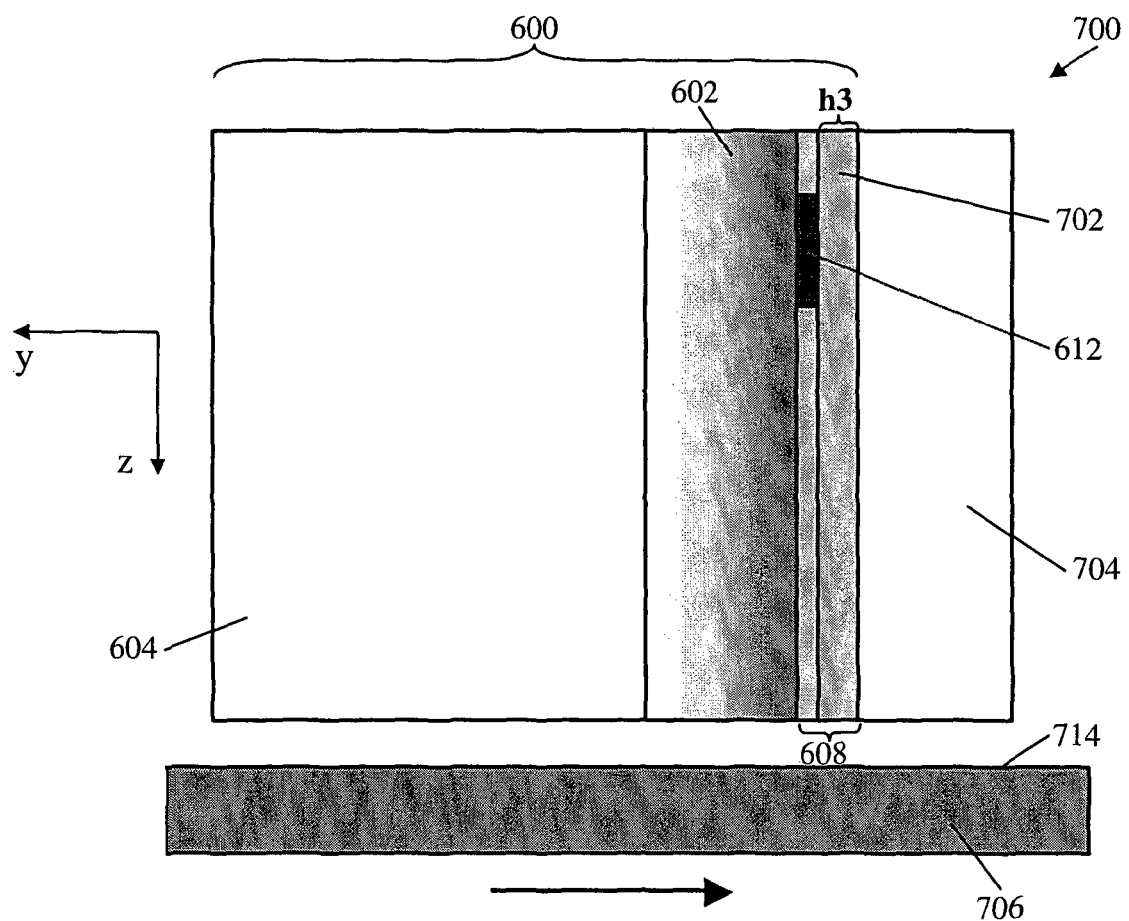
FIG. 7a shows a side view of a magnetic recording head according to one embodiment.

FIG. 7a shows a side view of a magnetic recording head 700 having the light coupling structure 600. FIG. 7a shows the side view of a magnetic recording head 700 in a y-z plane. The further cladding layer 702 of the waveguide 608 of the light coupling structure 600 is shown in FIG. 7a. In one embodiment, the further cladding layer 702 may have a height (h3) along a y-axis ranging from about 500 nm to about 2 μm. A length and a width of the further cladding layer 702 may have the same size as the length (L) and the width (W) of the light coupling structure 600 respectively. The magnetic recording head 700 has a writing head 704 disposed adjacent to the waveguide 608. If the magnetic recording head 700 is viewed in a three-dimensional view according to that of the light coupling structure 600 shown in FIG. 6, it will be seen that the writing head 704 is disposed above the waveguide 608 (e.g. formed on top of the further cladding layer 702 of the waveguide 608). In one embodiment, the magnetic recording head 700 may be a heat assisted magnetic recording head. A media layer or a recording layer 706 is disposed below the magnetic recording head 700. The writing head 704 can write bits of information onto a media layer or a recording layer 706 when the media layer or recording layer 706 moves in a circular motion or spins under the writing head 704.

Figure 7B:
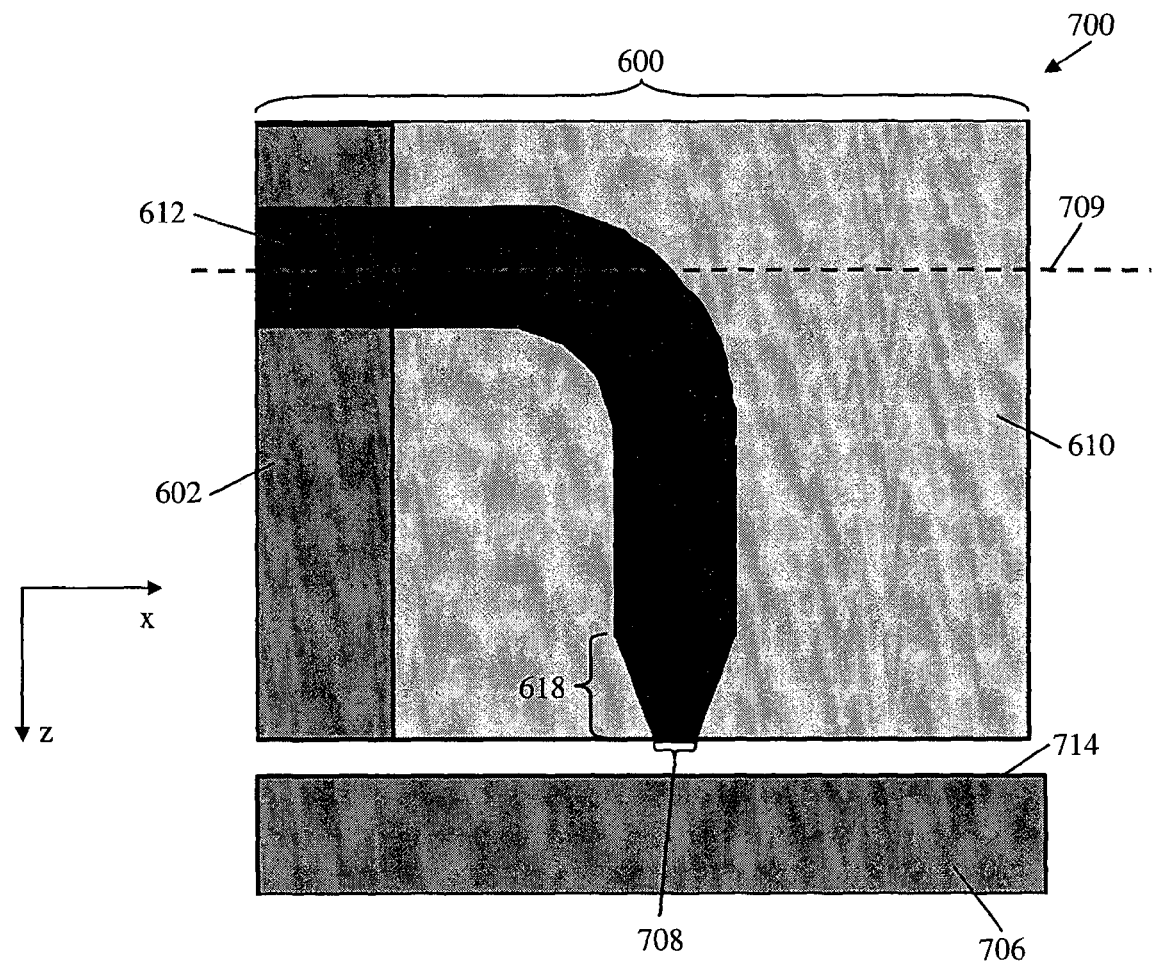
FIG. 7b shows an end view of a magnetic recording head according to one embodiment.

FIG. 7b shows an end view of the magnetic recording head 700. FIG. 7b shows an end view of the light coupling structure 600 of the magnetic recording head 700 in an x-z plane. The magnetic recording head 700 is arranged such that the tapering end region 618 of the core layer 612 is facing the media layer or recording layer 706. The tapering end region 618 is tapered in the x-z plane to an end 708. The end 708 may have a sub-micrometer width for light coupling to a transducer (not shown). The end 708 may have a width ranging between about 200 nm to about 2 μm. In one embodiment, the end 708 may have a width of about 300 nm.

Figure 7C:
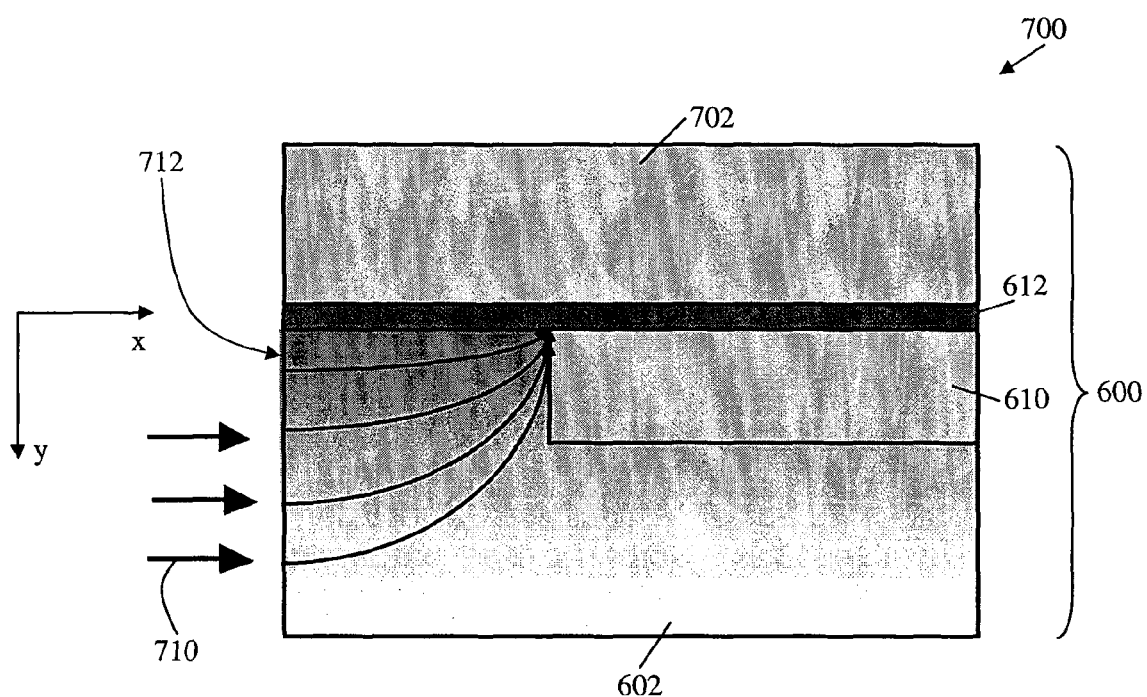
FIG. 7c shows a cross-sectional view of a magnetic recording head according to one embodiment.

FIG. 7c shows a cross-sectional view of the magnetic recording head 700 in an x-y plane along a dotted line 709 shown in FIG. 7b. A light 710 from a light source (not shown) is coupled into the light coupling structure 600 from one side 712 of the magnetic recording head 700. The light 710 is coupled into the light coupling structure 600 in a direction along an x-axis. Examples of the light source may include but are not limited to a laser diode and a light emitting diode. The light 710 coupled into the light coupling structure 400 may have a wavelength ranging from about 400 nm to about 1600 nm.

The light coupling layer 602 of the light coupling structure 600 receives the light 710 and couples the received light 710 into the core layer 612 of the waveguide 608. The light coupling layer 602 has a graded refractive index along a y-axis. The refractive index of the light coupling layer 602 may range from $n_0$ (for example, 2.0 to match a refractive index of the core layer 612 of the waveguide 608) to $n_R$ (for example, 1.5), which focuses or directs the light 708 in a direction along the y-axis to the core layer 612 of the waveguide 608. The light 708 is guided in the core layer 612 of the waveguide 408 (e.g. propagates in the core layer 612) in a direction along a z-axis because of a higher refractive index (e.g. 2.0) of the core layer 612 as compared to the refractive index (e.g. 1.5) of the cladding layer 610 and the further cladding layer 702. The waveguide 608 may then direct the light 708 to the media layer or the recording layer 706. The bending portion 618 of the waveguide 608 may guide the light 708 to e.g. an air bearing surface 714 (shown in FIGS. 7a and 7b) of the media layer or the recording layer 706. The media layer or recording layer 706 may be heated locally by the light delivered from the waveguide 608 before reaching the writing head 704 (e.g. before the writing head 704 starts writing bits of information onto the media layer or recording layer 706).

To obtain the highest or maximum coupling efficiency for the light coupling structure 400, 600, the light coupling layer 402, 602 (e.g. planar GRIN lens) of the light coupling structure 400, 600 is optimized. The optimization of the light coupling layer 402, 602 may include three processes.

In one embodiment, the first optimization process is to determine a graded refractive index profile of the light coupling layer 402, 602. The graded refractive index profile n(y) of the light coupling layer 402, 602 may be parabolic profile, Gaussian profile or computationally generated profile using the aberration-free algorithm (for example as described in Q. Wang, Y. Huang, T. Loh, D. Ng and S. Ho, "Thin-film stack based integrated GRIN coupler with aberration-free focusing and super-high NA for efficient fiber-to-nanophotonic-chip coupling", Opt. Exp. Vol. Vol. 18, Issue 5, pp. 4574-4589 (2010)). The graded refractive index of light coupling layer 402, 602 (e.g. planar GRIN lens) may range from an initial value $n_0$ to a final value $n_R$.

Figure 8:
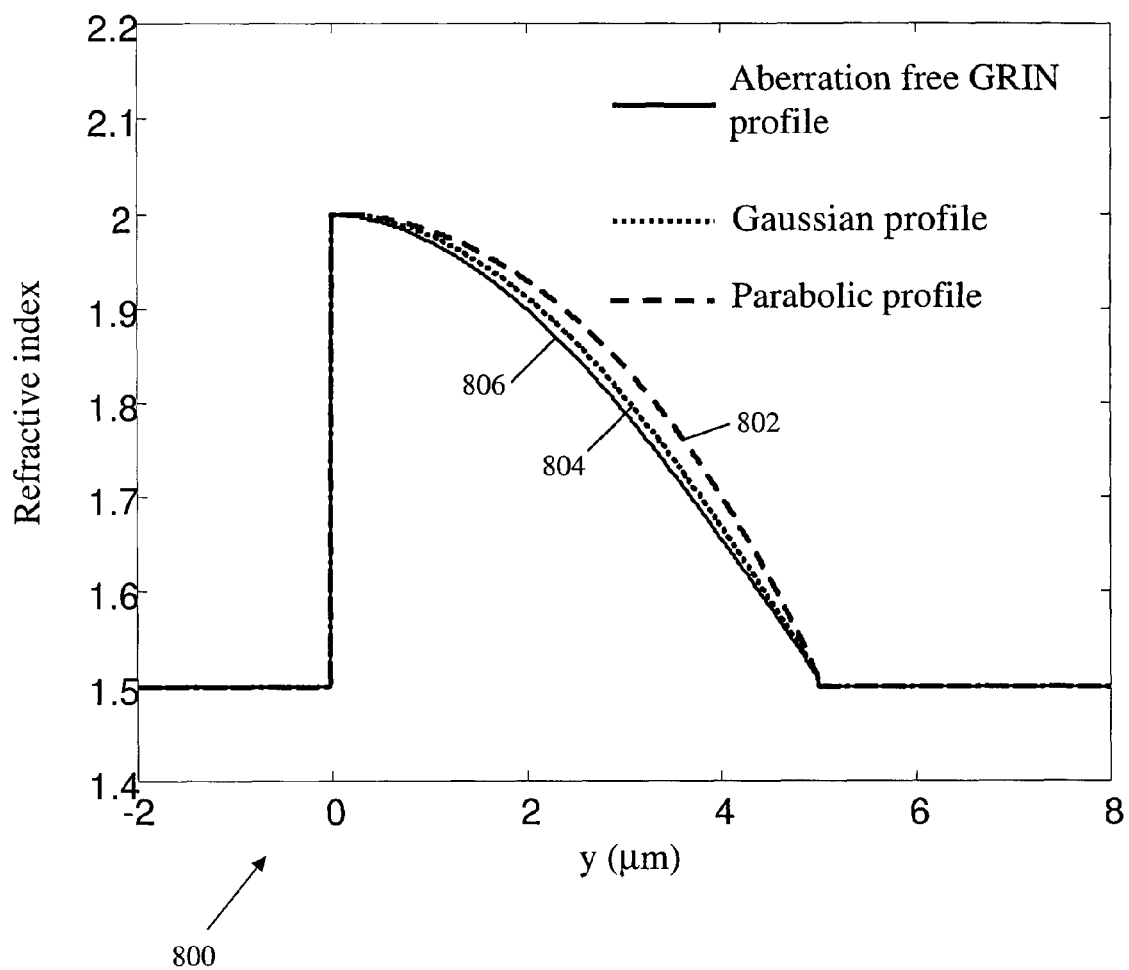
FIG. 8 shows a graph of a refractive index of a light coupling layer of a light coupling structure plotted against a dimension of the light coupling layer extending along a y-axis according to one embodiment.

FIG. 8 shows a graph 800 of a refractive index of the light coupling layer 402, 602 plotted against a dimension of the light coupling layer 402, 602 extending along a y-axis. In one embodiment, the dimension of the light coupling layer 402, 602 extending along the y-axis is about 5 μm. The dimension of the light coupling layer 402, 602 extending along the y-axis may be a thickness of the light coupling layer 402, 602. Graph 800 illustrates three different graded refractive index profiles of the light coupling layer 402, 602. Plot 802 shows a parabolic graded refractive index profile of the light coupling layer 402, 602. Plot 804 shows a Gaussian graded refractive index profile of the light coupling layer 402, 602. Plot 806 shows an aberration free graded refractive index profile of the light coupling layer 402, 602. Plot 802, plot 804 and plot 806 show that the graded refractive index of the light coupling layer 402, 602 may range from an initial value $n_0$ of about 2.0 to a final value $n_R$ of about 1.5.

Figure 9A:
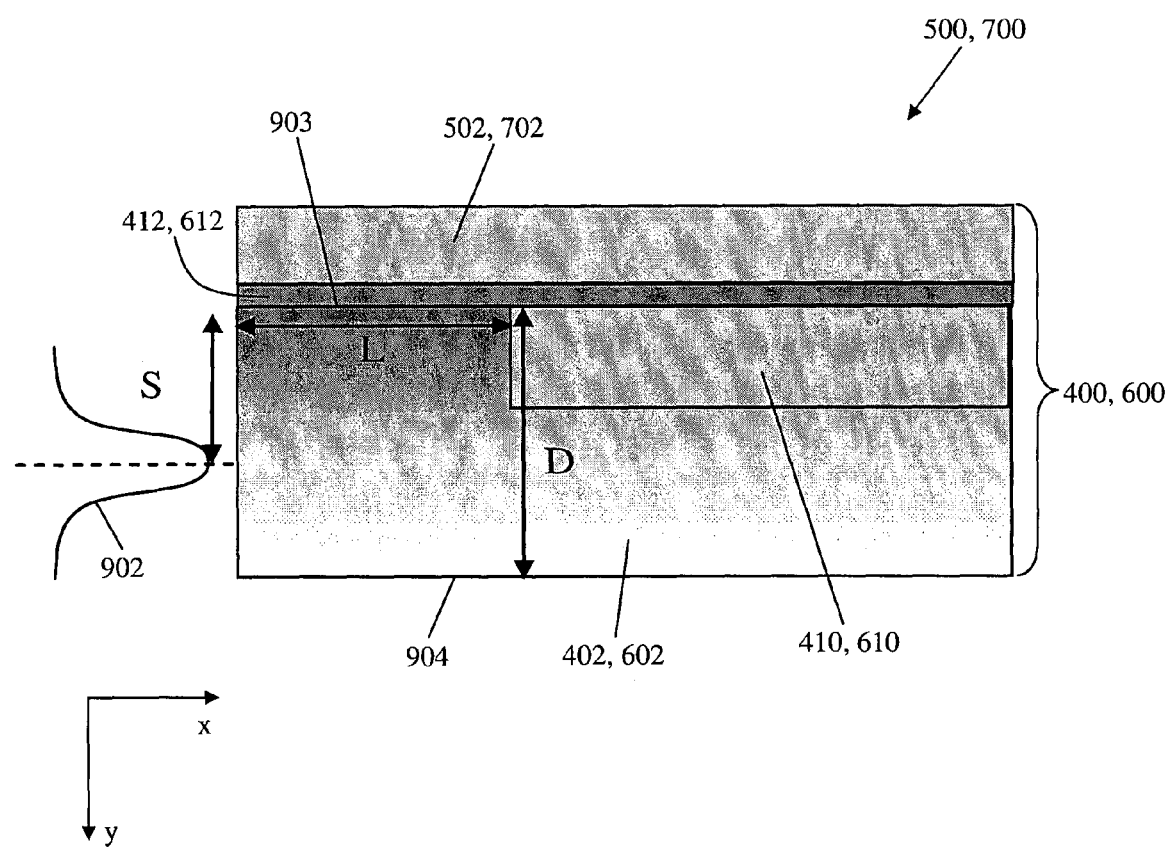
FIG. 9a shows a schematic diagram of a magnetic recording head according to one embodiment.

In one embodiment, the second optimization process is to optimize the structure parameters of the light coupling layer 402, 602 (e.g. planar GRIN lens). FIG. 9a shows a schematic diagram of the magnetic recording head 500, 700 having the light coupling structure 400, 600 to illustrate the various structure parameters of the light coupling layer 402, 602. The structure parameters may include but are not limited to a thickness (D) of the light coupling layer 402, 602, a length (L) of the light coupling layer 402, 602, a position of an input light beam 902 with respect to the light coupling layer 402, 602 (i.e. a distance (S) from a top surface 903 of the light coupling layer 402, 602 at which the light beam 902 is coupled into the light coupling layer 402, 602), and a refractive index of a bottom surface 904 of the light coupling layer 402, 602 (after the graded refractive index profile of the light coupling layer 402, 602 is determined).

Figure 9B:
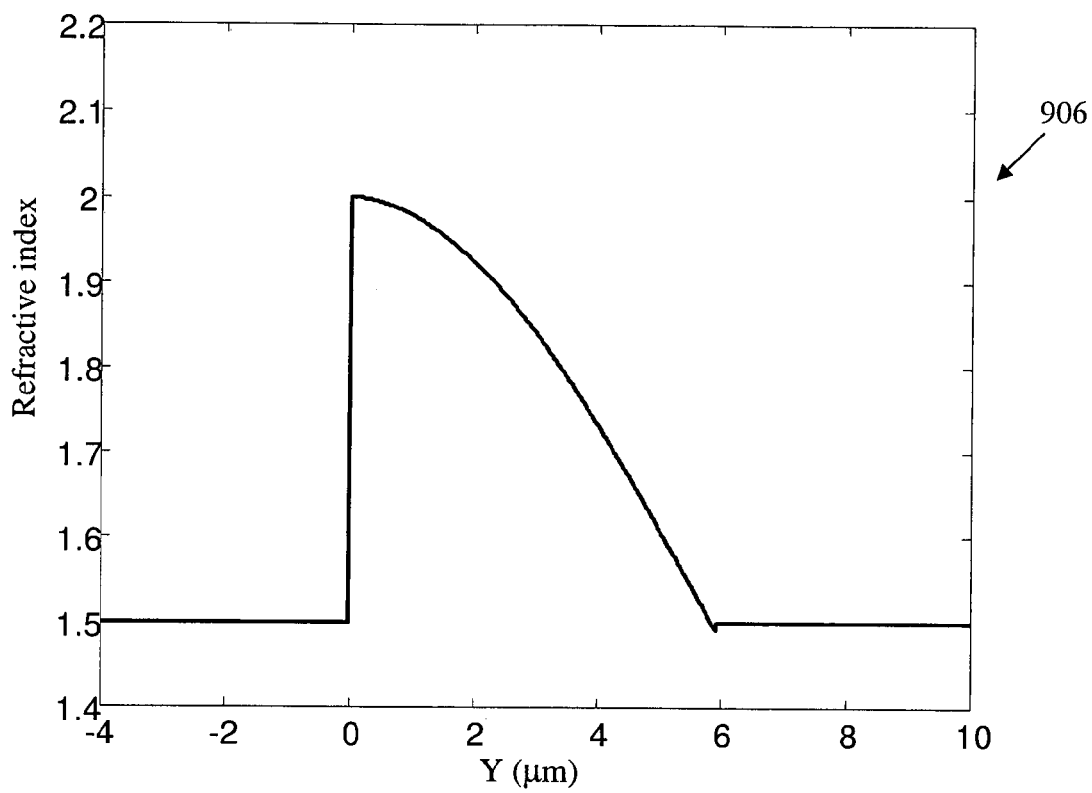
FIG. 9b shows a graph of a refractive index of a light coupling layer of a light coupling structure plotted against a dimension of the light coupling layer extending along a y-axis according to one embodiment.

A graded refractive index profile of the light coupling layer 402, 602 (e.g. planar GRIN lens) may be chosen to determine the optimized structure parameters of the light coupling layer 402, 602. FIG. 9b shows a graph 906 of a refractive index of the light coupling layer 402, 602 plotted against a dimension of the light coupling layer 402, 602 extending along a y-axis (e.g. a thickness of the light coupling layer 402, 602). Graph 906 shows that the light coupling layer 402, 602 has an aberration-free graded refractive index profile. Graph 906 also shows that the light coupling layer 402, 602 has a refractive index ranging from about 2.0 to about 1.5.

The light coupling layer 402, 602 having an aberration-free graded refractive index profile (shown in FIG. 9b) may have optimal parameters of L=11.95 μm, D=5.9 μm and S=2.35 μm. The light coupling layer 402, 602 may be designed with these parameters to couple a light beam with a spot size $W_e$ of about 4 μm into the waveguide 408, 608. The waveguide 408, 608 may have a thickness of about 300 nm. A refractive index of the core layer 412, 612 of the waveguide 408, 608 may be about 2.0 and a refractive index of the cladding layers 410, 502, 610, 702 of the waveguide 408, 608 may be about 1.5.

Figure 9C:
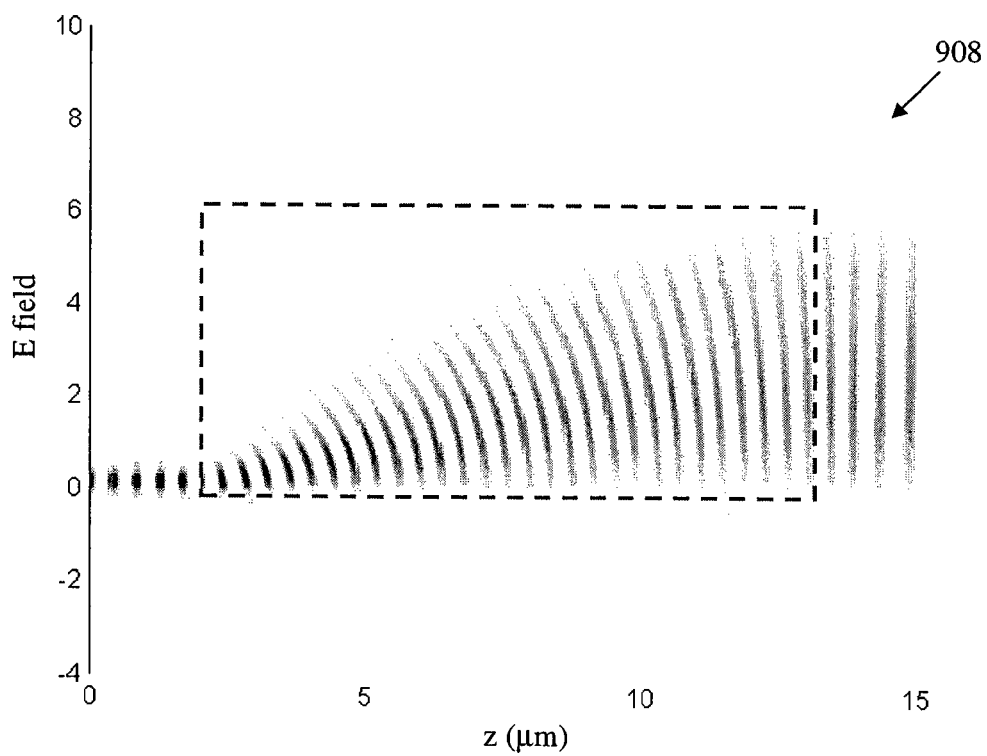
FIG. 9c shows a graph illustrating a simulation of light propagation in a light coupling layer of a light coupling structure in a dimension of the light coupling layer extending along a z-axis according to one embodiment.

The optimal values of the parameters of the light coupling layer 402, 602 may be scanned and a wide-angle beam propagation method may be used to estimate the coupling efficiency of the light coupling layer 402, 602. FIG. 9c shows a graph 908 illustrating a simulation of light propagation in the light coupling layer 402, 602 in a dimension of the light coupling layer 402, 602 extending along a z-axis. The estimated coupling efficiency of the light coupling layer 402, 602 is about 97% in terms of the mode matching.

In one embodiment, the third optimization process is to realize the graded refractive index profile of the light coupling layer 402, 602. Various embodiments may be provided for realizing the graded refractive index profile of the light coupling layer 402, 602.

Figure 10:
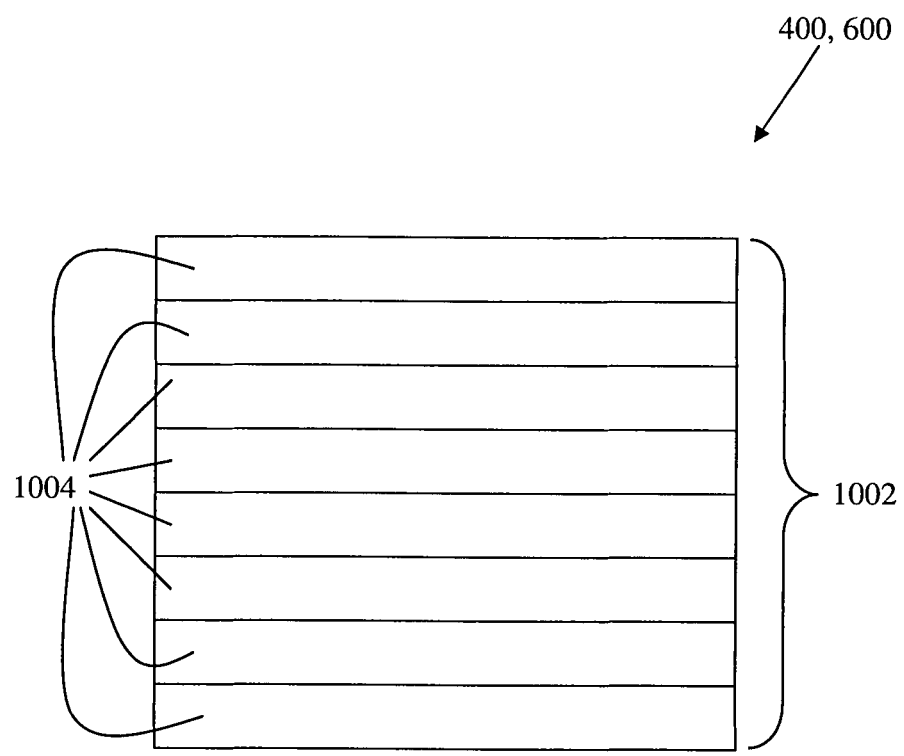
FIG. 10 shows a schematic diagram of a light coupling layer of a light coupling structure according to one embodiment.

The first approach is to use silicon oxynitride ($SiO_xN_y$) by controlling the composition. In one embodiment, the light coupling layer 402, 602 has a multi-layer stack 1002 of silicon oxynitride ($SiO_xN_y$) as shown in FIG. 10. Each layer 1004 of the multi-layer stack 1002 includes silicon oxynitride ($SiO_xN_y$). Each layer 1004 of the multi-layer stack 1002 has a refractive index $n_i$ and a thickness $h_i$. Each layer 1004 may be a thin film layer.

The number of layers 1004 of the multi-layer stack 1002 is different in different embodiments. In one embodiment, the light coupling layer 402, 602 has a multi-layer stack 1002 of twenty layers 1004. The stack 1002 may have a thickness (D) of about 1000 nm. The thickness $h_i$ of each layer may be about 50 nm.

Figure 11A:
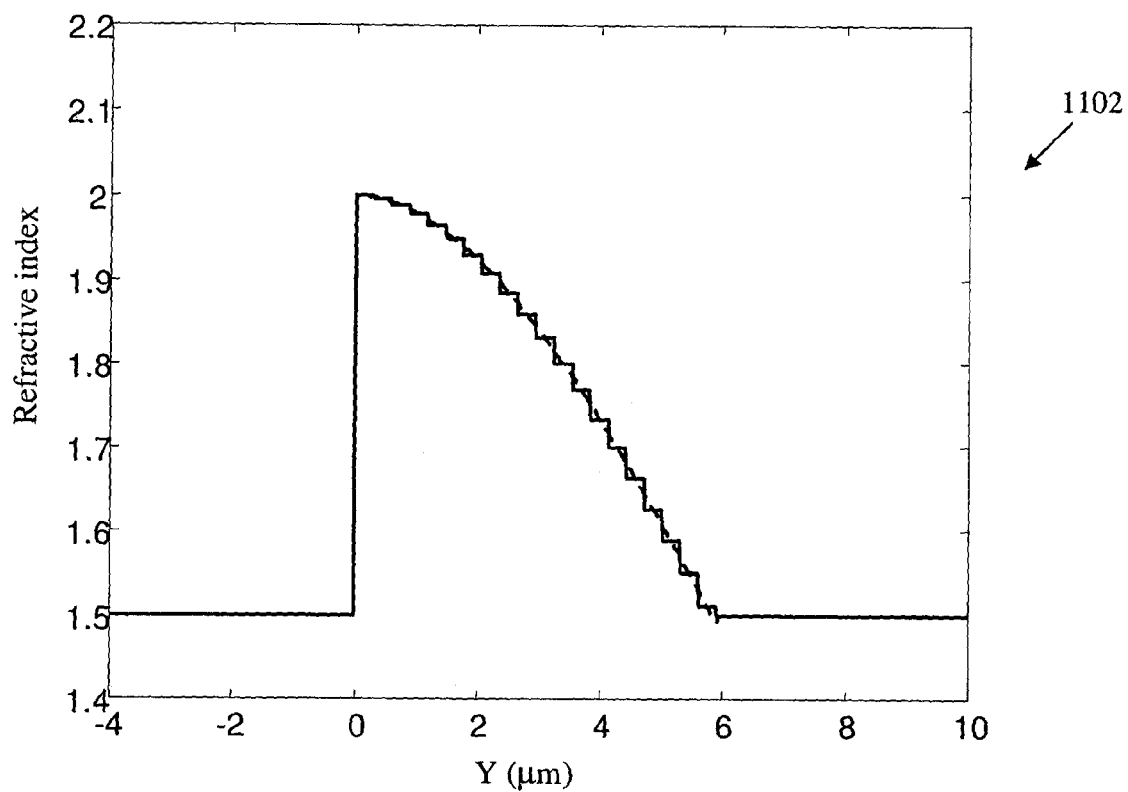
FIG. 11a shows a graph illustrating a graded refractive index profile of a light coupling layer of a light coupling structure according to one embodiment.

FIG. 11a shows a graph 1102 illustrating a graded refractive index profile of the light coupling layer 402, 602 having a multi-layer stack 1002 of twenty layers 1004. Graph 1102 shows that the light coupling layer 402, 602 has a discretized aberration-free graded refractive index profile. Since a silicon oxynitride (SiOxNy) thin-film stack 1002 is used, discretization of the continuous graded refractive index profile (e.g. aberration-free graded profile as shown in FIG. 9b) is required. Graph 1102 also shows that the light coupling layer 402, 602 has a refractive index ranging from about 2.0 to about 1.5.

Figure 11B:
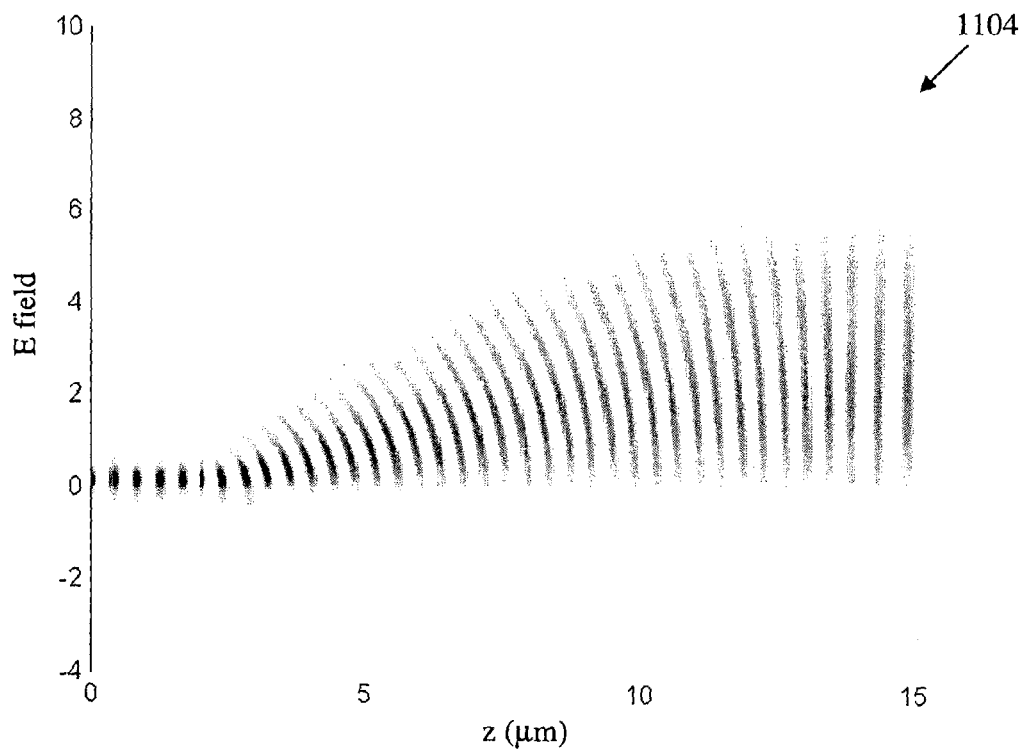
FIG. 11b shows a graph illustrating a simulation of light propagation in a light coupling layer of a light coupling structure in a dimension of the light coupling layer extending along a z-axis according to one embodiment.

FIG. 11b shows a graph 1104 illustrating a simulation of light propagation in the light coupling layer 402, 602 having the multi-layer stack 1002 of twenty layers 1004 in a dimension of the light coupling layer 402, 602 extending along a z-axis. The coupling efficiency of the light coupling layer 402, 602 may be about 97%.

Figure 12A:
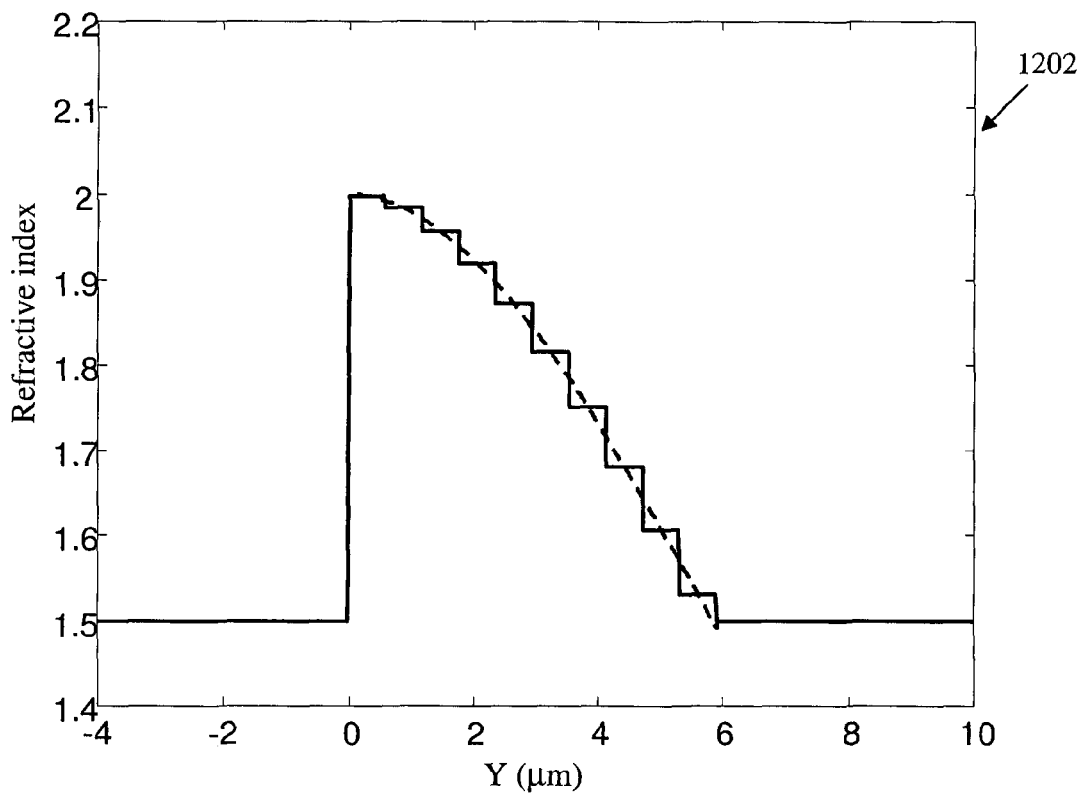
FIG. 12a shows a graph illustrating a graded refractive index profile of a light coupling layer of a light coupling structure according to one embodiment.

In one embodiment, the light coupling layer 402, 602 has a multi-layer stack 1002 of ten layers 1004. FIG. 12a shows a graph 1202 illustrating a graded refractive index profile of the light coupling layer 402, 602 having a multi-layer stack 1002 of ten layers 1004. Graph 1202 shows that the light coupling layer 402, 602 has a discretized aberration-free graded refractive index profile. Graph 1202 also shows that the light coupling layer 402, 602 has a refractive index ranging from about 2.0 to 1.5.

Figure 12B:
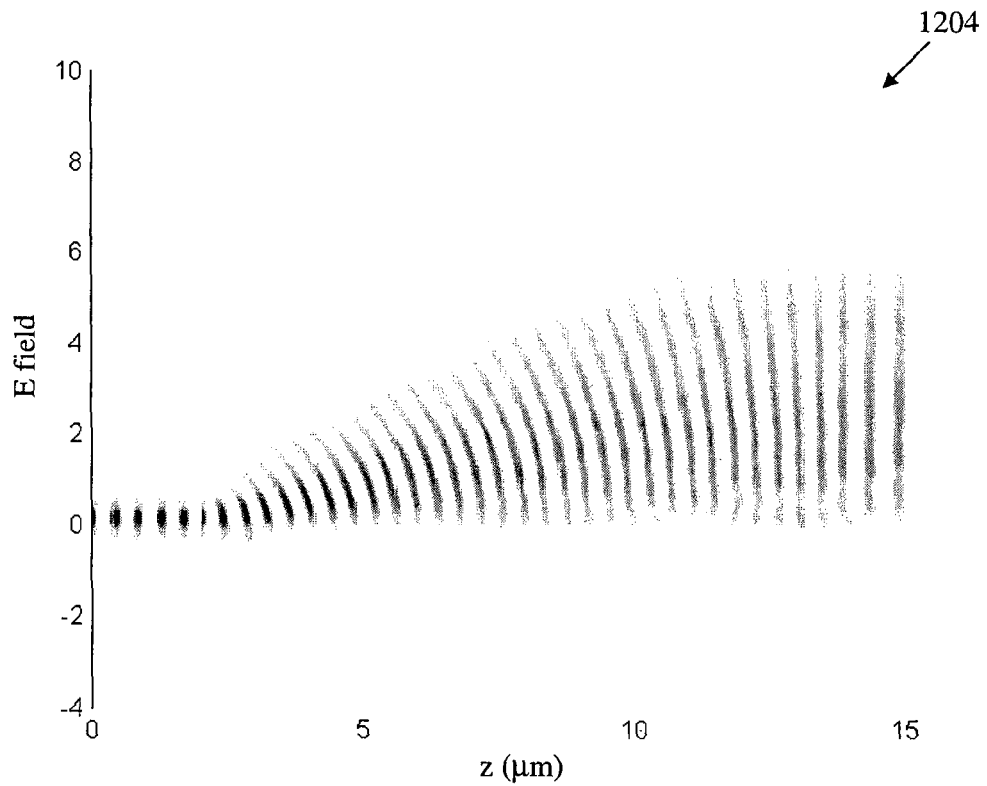
FIG. 12b shows a graph illustrating a simulation of light propagation in a light coupling layer of a light coupling structure in a dimension of the light coupling layer extending along a z-axis according to one embodiment.

FIG. 12b shows a graph 1204 illustrating a simulation of light propagation in the light coupling layer 402, 602 having the multi-layer stack 1002 of ten layers 1004 in a dimension of the light coupling layer 402, 602 extending along a z-axis. The coupling efficiency of the light coupling layer 402, 602 may be about 95%.

The second approach for realizing the graded refractive index profile of the light coupling layer 402, 602 is to use a two-material thin-film stack (for example as shown in Q. Wang, Y. Huang, T. Loh, D. Ng and S. Ho, "Thin-film stack based integrated GRIN coupler with aberration-free focusing and super-high NA for efficient fiber-to-nanophotonic-chip coupling", Opt. Exp. Vol. Vol. 18, Issue 5, pp. 4574-4589 (2010)). In other words, the multi-layer stack 1002 of the light coupling layer 402, 602 has two materials. Each layer 1004 of the multi-layer stack 1002 has at least two materials. The two materials may include silicon nitride and silicon dioxide.

Figure 13:
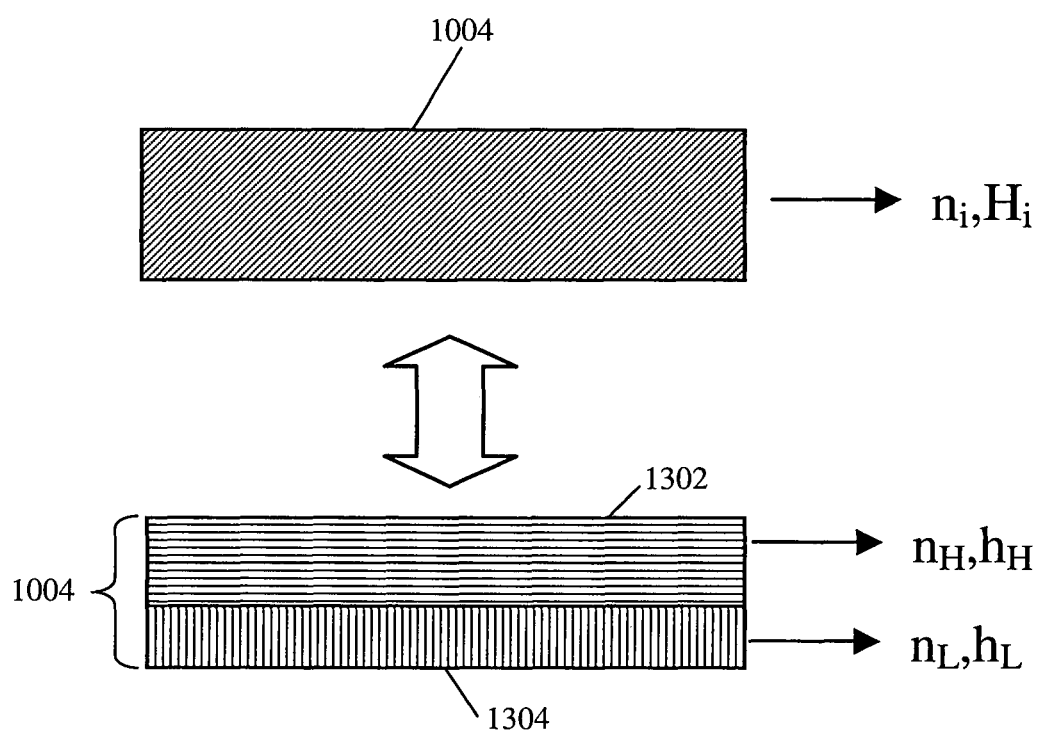
FIG. 13 illustrating a two materials approach approximating a layer of a multi-layer stack of a light coupling layer of a light coupling structure according to one embodiment.

FIG. 13 shows a two materials approach approximating a thin-film layer 1004. Each layer 1004 can be formed using a first material layer 1302 and a second material layer 1304. The first material layer 1302 may have a refractive index $n_H$ and a thickness $h_H$. The refractive index $n_H$ of the first material layer 1302 may be greater or equal to an initial value $n_0$ of the refractive index of the light coupling layer 402, 602. The second material layer 1304 may have a refractive index $n_L$ and a thickness $h_L$. The refractive index $n_L$ of the first material layer 1302 may be greater or equal to a final value $n_R$ of the refractive index of the light coupling layer 402, 602.

A thin-film layer 1004 having a refractive index $n_i$ within a range of $n_0$ to $n_R$ and a thickness $h_i$ can be approximated through the two thin-film layers using the following equations:

$$n_i^2 h_i = n_H^2 h_H + n_L^2 h_L$$

$$h_i = h_H + h_L$$

In one embodiment, the first material layer 1302 includes silicon nitride and the second material layer 1304 includes silicon dioxide. In another embodiment, the first material layer 1302 includes silicon dioxide and the second material layer 1304 includes silicon nitride.

In one embodiment, the light coupling layer 402, 602 has a multi-layer stack 1002 of twenty layers 1004. The multi-layer stack 1002 has twenty first material layers 1302 and twenty second material layers 1304. The thin-film stack 1002 has 40-layer silicon nitride and silicon dioxide. The plurality of layers 1004 of the multi-layer stack 1002 may be arranged such that the first material layer 1302 of one layer 1004 is disposed adjacent to the second material layer 1304 of an adjacent layer 1004.

Figure 14A:
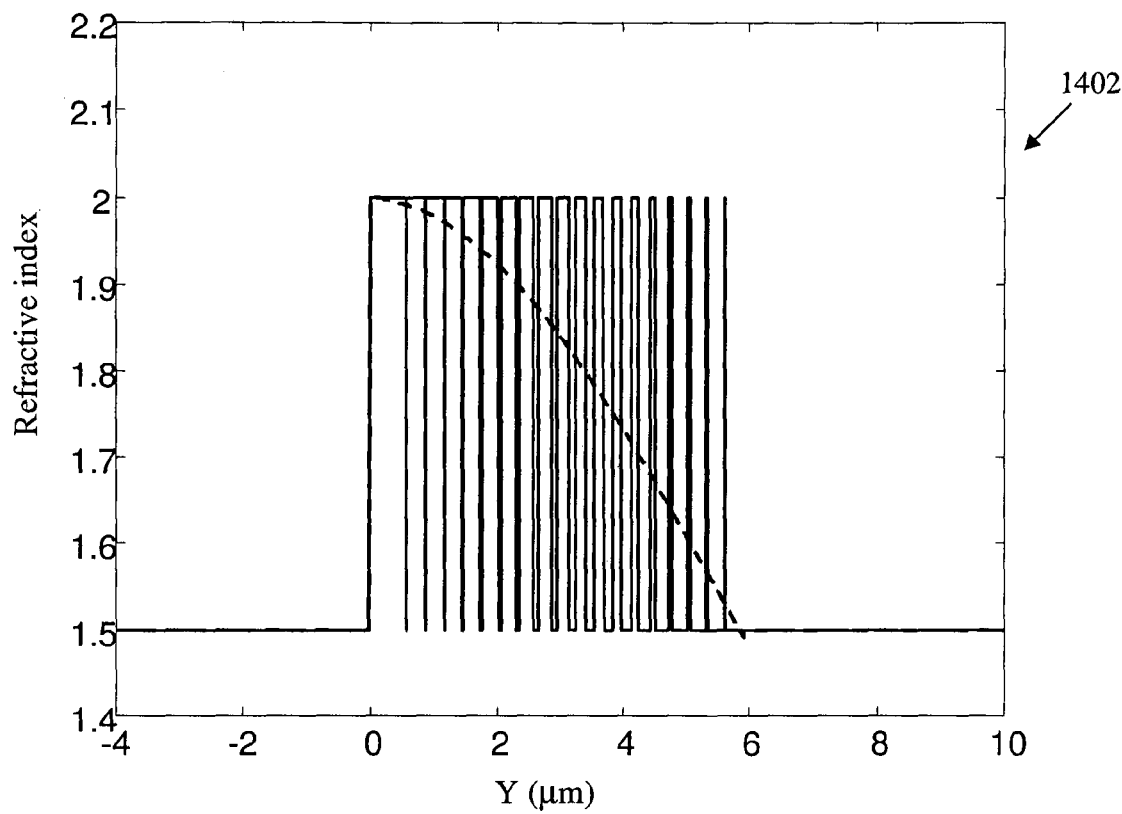
FIG. 14a shows a graph illustrating a refractive index profile of a light coupling layer of a light coupling structure according to one embodiment.

FIG. 14a shows a graph 1402 illustrating a refractive index profile of the light coupling layer 402, 602 having a two-material multi-layer stack 1002 of twenty layers 1004. Graph 1402 shows that the light coupling layer 402, 602 has a binary refractive index profile. Graph 1402 also shows that the light coupling layer 402, 602 has a refractive index ranging from about 2.0 to 1.5.

The two-material thin-film stack 1002 of the light coupling layer 402, 602 may have a binary refractive index profile but can work equivalently as a GRIN lens by designing the layout of the two-material thin-film stack 1002. A graded refractive index profile may be achieved by using the two-material thin-film stack 1002.

Figure 14B:
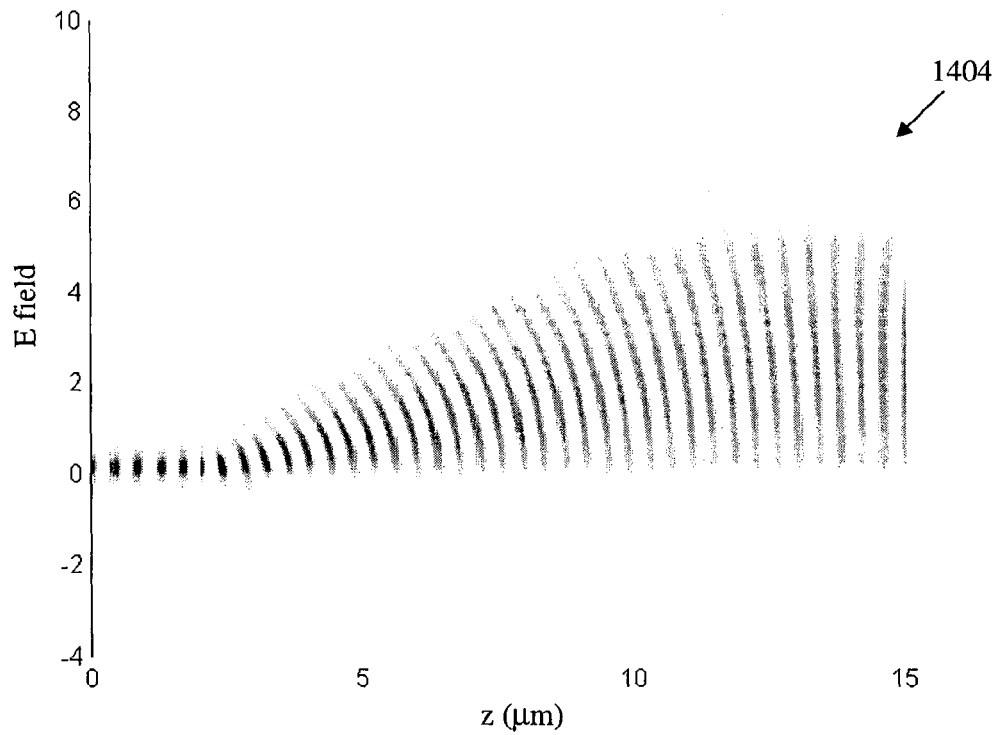
FIG. 14b shows a graph illustrating a simulation of light propagation in a light coupling layer of a light coupling structure in a dimension of the light coupling layer extending along a z-axis according to one embodiment.

FIG. 14b shows a graph 1404 illustrating a simulation of light propagation in the light coupling layer 402, 602 having the two-material multi-layer stack 1002 of twenty layers 1004 in a dimension of the light coupling layer 402, 602 extending along a z-axis. The coupling efficiency of the light coupling layer 402, 602 is estimated to be about 93.5%.

Figure 15:
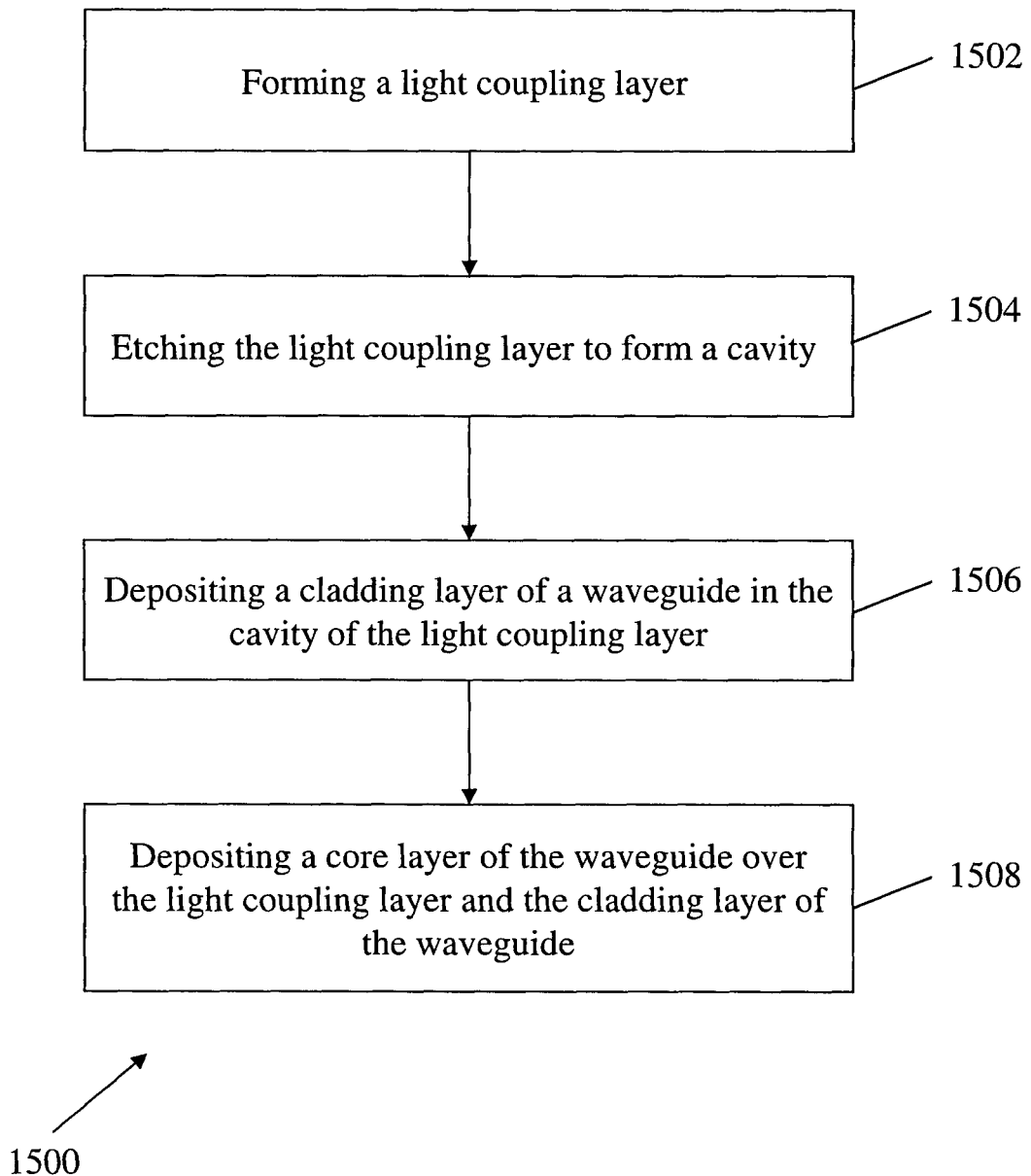
FIG. 15 shows a flowchart of a process of forming a light coupling structure according to one embodiment.

FIG. 15 shows a flowchart 1500 of a process of forming a light coupling structure. At 1502, a light coupling layer is formed. At 1504, the light coupling layer is etched to form a cavity. At 1506, a cladding layer of a waveguide is deposited in the cavity of the light coupling layer. At 1508, a core layer of the waveguide is deposited over the light coupling layer and the cladding layer of the waveguide.

In one embodiment, the light coupling layer may be formed by depositing a plurality of thin film layers. The plurality of thin film layers may include silicon oxynitride.

In another embodiment, each thin film layer may include two materials. The two materials may include silicon nitride and silicon dioxide.

In one embodiment, the light coupling layer and the cladding layer of the waveguide may be planarized before the core layer of the waveguide is deposited. The core layer of the waveguide may be etched.

In one embodiment, the core layer of the waveguide may be etched such that the core layer has a tapering end region.

In another embodiment, the core layer of the waveguide may be etched such that the core layer is L-shaped. The core layer of the waveguide may include a bending portion.

In one embodiment, a further cladding layer may be deposited on the core layer of the waveguide.

Figure 16:
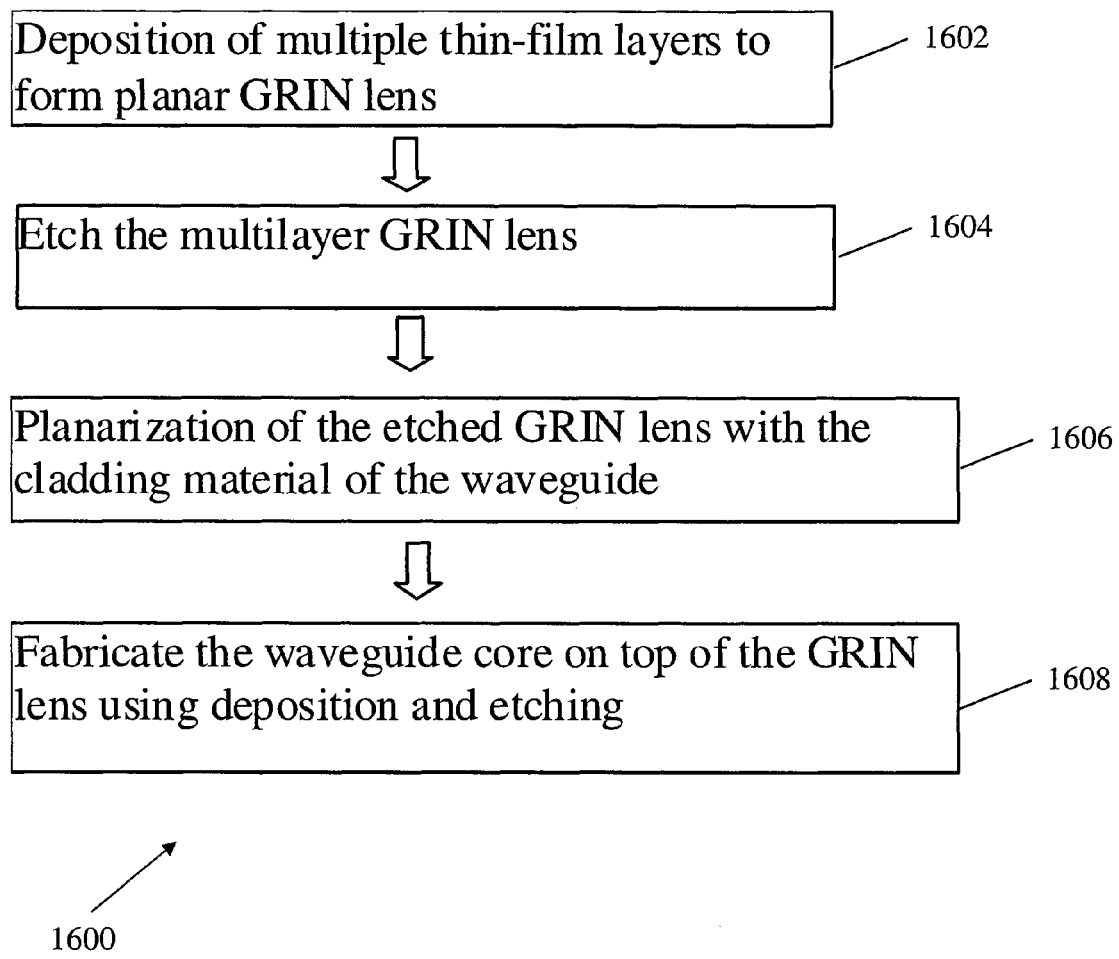
FIG. 16 shows a flowchart of a process of forming a light coupling structure according to one embodiment.

FIG. 16 shows a flowchart 1600 of an exemplary process of forming a light coupling structure. The fabrication steps of forming a planar graded refractive index (GRIN) lens (e.g. in the form of a light coupling layer) and a waveguide of the light coupling structure are described in the following. Fabrication of an integrated optical coupler is also described in the following.

At 1602, multiple thin-film layers may be deposited to form a planar GRIN lens. The planar GRIN lens may have a graded refractive index profile in a direction along a y-axis (e.g. y-axis as shown in FIGS. 4 and 6). At 1604, the multi-layer GRIN lens may be etched. A cladding material of a waveguide may be filled in the etched portion of the GRIN lens. An integrated optical coupler may be formed by etching the GRIN lens and filling the cladding material in the etched portion of the GRIN lens. At 1606, the etched GRIN lens and the cladding material of the waveguide may be planarized. At 1608, a core layer of the waveguide may be deposited on the GRIN lens. The core layer of the waveguide may also be deposited on the cladding material of the waveguide. The core layer of the waveguide may be etched.

There is no strict requirement for an etching depth for the above described processes of forming the light coupling structure. The etching depth may be about 0.9 µm, about 1 µm or about 1.1 µm.

The process of forming the light coupling structure is simpler as compared to an approach of fabricating a waveguide first and forming a GRIN lens coupler on top of the waveguide which may require deep-etching and precise control of an etching depth.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light coupling structure, comprising:
a light coupling layer having a cavity;
a waveguide having a cladding layer and a core layer;
wherein the cladding layer of the waveguide is disposed in the cavity of the light coupling layer and the core layer of the waveguide is disposed over the light coupling layer and the cladding layer of the waveguide;
wherein the light coupling layer is configured to receive light from a light source and couple the received light into the core layer of the waveguide.

2. The light coupling structure of claim 1,
wherein the light coupling layer comprises a planar graded refractive index (GRIN) lens.

3. The light coupling structure of claim 1,
wherein the light coupling layer has a graded refractive index profile.

4. The light coupling structure of claim 3,
wherein the graded refractive index profile comprises any one of a group consisting of parabolic profile, Gaussian profile, and computationally generated profile.

5. The light coupling structure of claim 1,
wherein the light coupling layer comprises a multi-layer stack of silicon oxynitride.

6. The light coupling structure of claim 1,
wherein the light coupling layer comprises a multi-layer stack, wherein each layer of the multi-layer stack comprises two materials.

7. The light coupling structure of claim 6,
wherein the two materials comprise silicon nitride and silicon dioxide.

8. The light coupling structure of claim 1,
wherein the core layer of the waveguide comprises a tapering end region.

9. The light coupling structure of claim 1,
wherein the core layer of the waveguide is L-shaped.

10. The light coupling structure of claim 9,
wherein the core layer of the waveguide comprises a bending portion.

11. The light coupling structure of claim 1,
wherein the waveguide further comprises a further cladding layer disposed on the core layer.

12. A method of forming a light coupling structure, the method comprising:
forming a light coupling layer;
etching the light coupling layer to form a cavity;
depositing a cladding layer of a waveguide in the cavity of the light coupling layer; and
depositing a core layer of the waveguide over the light coupling layer and the cladding layer of the waveguide.

13. The method of claim 12,
wherein the light coupling layer is formed by depositing a plurality of thin film layers.

14. The method of claim 13, wherein the plurality of thin film layers comprise silicon oxynitride.

15. The method of claim 13, wherein each thin film layer comprises two materials.

16. The method of claim 12, further comprising etching the core layer of the waveguide.

17. The method of claim 16, wherein the core layer of the waveguide is etched such that the core layer comprises a tapering end region.

18. The method of claim 16, wherein the core layer of the waveguide is etched such that the core layer is L-shaped.

19. The method of claim 18, wherein the core layer of the waveguide comprises a bending portion.

* * * * *